United States Patent
Brantner et al.

(10) Patent No.: US 8,350,519 B2
(45) Date of Patent: Jan. 8, 2013

(54) PASSIVE OVER/UNDER VOLTAGE CONTROL AND PROTECTION FOR ENERGY STORAGE DEVICES ASSOCIATED WITH ENERGY HARVESTING

(75) Inventors: Paul C. Brantner, Conifer, CO (US); Joseph A. Keating, Broomfield, CO (US); Raymond R. Johnson, Denver, CO (US); Timothy N. Bradow, Littleton, CO (US); Prativadi B. Narayan, Broomfield, CO (US); Bernd J. Neudecker, Littleton, CO (US)

(73) Assignee: Infinite Power Solutions, Inc, Littleton, CO (US)

( * ) Notice: Subject to any disclaimer, the term of this patent is extended or adjusted under 35 U.S.C. 154(b) by 675 days.

(21) Appl. No.: 12/417,351

(22) Filed: Apr. 2, 2009

(65) Prior Publication Data
US 2009/0251099 A1 Oct. 8, 2009

Related U.S. Application Data

(60) Provisional application No. 61/103,746, filed on Oct. 8, 2008, provisional application No. 61/041,841, filed on Apr. 2, 2008.

(51) Int. Cl.
*H01M 10/44* (2006.01)
*H02J 7/00* (2006.01)
*H02H 3/00* (2006.01)
*H01G 2/12* (2006.01)

(52) U.S. Cl. ........ 320/101; 320/132; 320/134; 320/136; 361/6; 361/8; 361/15; 361/16; 361/56

(58) Field of Classification Search .................... 320/118
See application file for complete search history.

(56) References Cited

U.S. PATENT DOCUMENTS
712,316 A 10/1902 Loppe et al.
(Continued)

FOREIGN PATENT DOCUMENTS
CN 1415124 4/2003
(Continued)

OTHER PUBLICATIONS

Abraham, K.M. et al., "Inorganic-organic composite solid polymer electrolytes," 147(4) J. Electrochem. Soc. 1251-56 (2000).

(Continued)

*Primary Examiner* — Edward Tso
*Assistant Examiner* — Ahmed Omar
(74) *Attorney, Agent, or Firm* — Jeff E. Schwartz; Fox Rothschild LLP

(57) ABSTRACT

Described herein is, for example, a battery or capacitor over voltage (overcharge) and under-voltage protection circuit, that, for example, is adapted to not draw current from the battery or capacitor to be charged unless charge energy is detected and to not charge an energy storage device when an over-charge condition is sensed. The protection circuit may, for example, not be turned on unless an over voltage condition is present. Incoming energy to the system can be shunted to ground via a shunt load of various types including resistive loads and active components such as a zener diode. In some embodiments, no switching of the inbound power is required. Within limits, no regulation of inbound power is needed. When inbound power is sufficient to charge the battery or capacitor, regulation can occur via the applied shunt regulator if overcharge voltage conditions exist. Either type of charge source, voltage or current, can be used to provide charge energy. Combining said battery or capacitor over voltage (overcharge) and under-voltage protection circuit with electronic loads, such as wireless sensors, may lead to autonomously-powered wireless sensor systems.

52 Claims, 11 Drawing Sheets

U.S. PATENT DOCUMENTS

| | | | |
|---|---|---|---|
| 2,970,180 A | 1/1961 | Urry | |
| 3,309,302 A | 3/1967 | Heil | |
| 3,616,403 A | 10/1971 | Collins et al. | |
| 3,790,432 A | 2/1974 | Fletcher et al. | |
| 3,797,091 A | 3/1974 | Gavin | |
| 3,850,604 A | 11/1974 | Klein | |
| 3,939,008 A | 2/1976 | Longo et al. | |
| 4,082,569 A | 4/1978 | Evans, Jr. | |
| 4,111,523 A | 9/1978 | Kaminow et al. | |
| 4,127,424 A | 11/1978 | Ullery, Jr. | |
| 4,226,924 A | 10/1980 | Kimura et al. | |
| 4,283,216 A | 8/1981 | Brereton | |
| 4,318,938 A | 3/1982 | Barnett et al. | |
| 4,328,297 A | 5/1982 | Bilhorn | |
| 4,395,713 A | 7/1983 | Nelson et al. | |
| 4,437,966 A | 3/1984 | Hope et al. | |
| 4,442,144 A | 4/1984 | Pipkin | |
| 4,467,236 A | 8/1984 | Kolm et al. | |
| 4,481,265 A | 11/1984 | Ezawa et al. | |
| 4,518,661 A | 5/1985 | Rippere | |
| 4,555,456 A | 11/1985 | Kanehori et al. | |
| 4,572,873 A | 2/1986 | Kanehori et al. | |
| 4,587,225 A | 5/1986 | Tsukuma et al. | |
| 4,619,680 A | 10/1986 | Nourshargh et al. | |
| 4,645,726 A | 2/1987 | Hiratani et al. | |
| 4,664,993 A | 5/1987 | Sturgis et al. | |
| 4,668,593 A | 5/1987 | Sammells | |
| RE32,449 E | 6/1987 | Claussen | |
| 4,672,586 A | 6/1987 | Shimohigashi et al. | |
| 4,710,940 A | 12/1987 | Sipes, Jr. | |
| 4,728,588 A | 3/1988 | Noding et al. | |
| 4,740,431 A | 4/1988 | Little | |
| 4,756,717 A | 7/1988 | Sturgis et al. | |
| 4,785,459 A | 11/1988 | Baer | |
| 4,826,743 A | 5/1989 | Nazri | |
| 4,865,428 A | 9/1989 | Corrigan | |
| 4,878,094 A | 10/1989 | Balkanski | |
| 4,903,326 A | 2/1990 | Zakman et al. | |
| 4,915,810 A | 4/1990 | Kestigian et al. | |
| 4,964,877 A | 10/1990 | Keister et al. | |
| 4,977,007 A | 12/1990 | Kondo et al. | |
| 4,978,437 A | 12/1990 | Wirz | |
| 5,006,737 A | 4/1991 | Fay | |
| 5,019,467 A | 5/1991 | Fujiwara | |
| 5,030,331 A | 7/1991 | Sato | |
| 5,035,965 A | 7/1991 | Sangyoji et al. | |
| 5,055,704 A | 10/1991 | Link et al. | |
| 5,057,385 A | 10/1991 | Hope et al. | |
| 5,085,904 A | 2/1992 | Deak et al. | |
| 5,096,852 A | 3/1992 | Hobson | |
| 5,100,821 A | 3/1992 | Fay | |
| 5,107,538 A | 4/1992 | Benton et al. | |
| 5,110,694 A | 5/1992 | Nagasubramanian et al. | |
| 5,110,696 A | 5/1992 | Shokoohi et al. | |
| 5,119,269 A | 6/1992 | Nakayama | |
| 5,119,460 A | 6/1992 | Bruce et al. | |
| 5,124,782 A | 6/1992 | Hundt et al. | |
| 5,147,985 A | 9/1992 | DuBrucq | |
| 5,153,710 A | 10/1992 | McCain | |
| 5,169,408 A | 12/1992 | Biggerstaff et al. | |
| 5,171,413 A | 12/1992 | Arntz et al. | |
| 5,173,271 A | 12/1992 | Chen et al. | |
| 5,174,876 A | 12/1992 | Buchal et al. | |
| 5,180,645 A | 1/1993 | Moré | |
| 5,187,564 A | 2/1993 | McCain | |
| 5,196,041 A | 3/1993 | Tumminelli et al. | |
| 5,196,374 A | 3/1993 | Hundt et al. | |
| 5,200,029 A | 4/1993 | Bruce et al. | |
| 5,202,201 A | 4/1993 | Meunier et al. | |
| 5,206,925 A | 4/1993 | Nakazawa et al. | |
| 5,208,121 A | 5/1993 | Yahnke et al. | |
| 5,217,828 A | 6/1993 | Sangyoji et al. | |
| 5,221,891 A | 6/1993 | Janda et al. | |
| 5,225,288 A | 7/1993 | Beeson et al. | |
| 5,227,264 A | 7/1993 | Duval et al. | |
| 5,237,439 A | 8/1993 | Misono et al. | |
| 5,252,194 A | 10/1993 | Demaray et al. | |
| 5,262,254 A | 11/1993 | Koksbang et al. | |
| 5,273,608 A | 12/1993 | Nath | |
| 5,287,427 A | 2/1994 | Atkins et al. | |
| 5,296,089 A | 3/1994 | Chen et al. | |
| 5,300,461 A | 4/1994 | Ting | |
| 5,302,474 A | 4/1994 | Shackle et al. | |
| 5,303,319 A | 4/1994 | Ford et al. | |
| 5,306,569 A | 4/1994 | Hiraki | |
| 5,307,240 A | 4/1994 | McMahon | |
| 5,309,302 A | 5/1994 | Vollmann | |
| 5,314,765 A | 5/1994 | Bates | |
| 5,326,652 A | 7/1994 | Lake | |
| 5,326,653 A | 7/1994 | Chang | |
| 5,338,624 A | 8/1994 | Gruenstern et al. | |
| 5,338,625 A | 8/1994 | Bates et al. | |
| 5,342,709 A | 8/1994 | Yahnke et al. | |
| 5,355,089 A | 10/1994 | Treger et al. | |
| 5,360,686 A | 11/1994 | Peled et al. | |
| 5,362,579 A | 11/1994 | Rossoll et al. | |
| 5,381,262 A | 1/1995 | Arima et al. | |
| 5,387,482 A | 2/1995 | Anani | |
| 5,401,595 A | 3/1995 | Kagawa et al. | |
| 5,403,680 A | 4/1995 | Otagawa et al. | |
| 5,411,537 A | 5/1995 | Munshi et al. | |
| 5,411,592 A | 5/1995 | Ovshinsky et al. | |
| 5,419,982 A | 5/1995 | Tura et al. | |
| 5,427,669 A | 6/1995 | Drummond | |
| 5,435,826 A | 7/1995 | Sakakibara et al. | |
| 5,437,692 A | 8/1995 | Dasgupta et al. | |
| 5,445,856 A | 8/1995 | Chaloner-Gill | |
| 5,445,906 A | 8/1995 | Hobson et al. | |
| 5,448,110 A | 9/1995 | Tuttle et al. | |
| 5,449,576 A | 9/1995 | Anani | |
| 5,455,126 A | 10/1995 | Bates et al. | |
| 5,457,569 A | 10/1995 | Liou et al. | |
| 5,458,995 A | 10/1995 | Behl et al. | |
| 5,464,692 A | 11/1995 | Huber | |
| 5,464,706 A | 11/1995 | Dasgupta et al. | |
| 5,470,396 A | 11/1995 | Mongon et al. | |
| 5,472,795 A | 12/1995 | Atita | |
| 5,475,528 A | 12/1995 | LaBorde | |
| 5,478,456 A | 12/1995 | Humpal et al. | |
| 5,483,613 A | 1/1996 | Bruce et al. | |
| 5,493,177 A | 2/1996 | Muller et al. | |
| 5,498,489 A | 3/1996 | Dasgupta et al. | |
| 5,499,207 A | 3/1996 | Miki et al. | |
| 5,501,918 A | 3/1996 | Gruenstern et al. | |
| 5,504,041 A | 4/1996 | Summerfelt | |
| 5,512,147 A | 4/1996 | Bates et al. | |
| 5,512,387 A | 4/1996 | Ovshinsky | |
| 5,512,389 A | 4/1996 | Dasgupta et al. | |
| 5,538,796 A | 7/1996 | Schaffer et al. | |
| 5,540,742 A | 7/1996 | Sangyoji et al. | |
| 5,547,780 A | 8/1996 | Kagawa et al. | |
| 5,547,782 A | 8/1996 | Dasgupta et al. | |
| 5,552,242 A | 9/1996 | Ovshinsky et al. | |
| 5,555,127 A | 9/1996 | Abdelkader et al. | |
| 5,561,004 A | 10/1996 | Bates et al. | |
| 5,563,979 A | 10/1996 | Bruce et al. | |
| 5,565,071 A | 10/1996 | Demaray et al. | |
| 5,567,210 A | 10/1996 | Bates et al. | |
| 5,569,520 A | 10/1996 | Bates | |
| 5,582,935 A | 12/1996 | Dasgupta et al. | |
| 5,591,520 A | 1/1997 | Migliorini et al. | |
| 5,597,660 A | 1/1997 | Bates et al. | |
| 5,597,661 A | 1/1997 | Takeuchi et al. | |
| 5,599,355 A | 2/1997 | Nagasubramanian et al. | |
| 5,601,952 A | 2/1997 | Dasgupta et al. | |
| 5,603,816 A | 2/1997 | Demaray et al. | |
| 5,607,560 A | 3/1997 | Hirabayashi et al. | |
| 5,607,789 A | 3/1997 | Treger et al. | |
| 5,612,152 A | 3/1997 | Bates et al. | |
| 5,612,153 A | 3/1997 | Moulton et al. | |
| 5,613,995 A | 3/1997 | Bhandarkar et al. | |
| 5,616,933 A | 4/1997 | Li | |
| 5,618,382 A | 4/1997 | Mintz et al. | |
| 5,625,202 A | 4/1997 | Chai | |
| 5,637,418 A | 6/1997 | Brown et al. | |
| 5,643,480 A | 7/1997 | Gustavsson et al. | |
| 5,644,207 A | 7/1997 | Lew et al. | |

| | | | | | | | |
|---|---|---|---|---|---|---|---|
| 5,645,626 | A | 7/1997 | Edlund et al. | 6,000,603 | A | 12/1999 | Koskenmaki et al. |
| 5,645,960 | A | 7/1997 | Scrosati et al. | 6,001,224 | A | 12/1999 | Drummond et al. |
| 5,654,054 | A | 8/1997 | Tropsha et al. | 6,004,660 | A | 12/1999 | Topolski et al. |
| 5,654,984 | A | 8/1997 | Hershbarger et al. | 6,007,945 | A | 12/1999 | Jacobs et al. |
| 5,658,652 | A | 8/1997 | Sellergren | 6,013,949 | A | 1/2000 | Tuttle |
| 5,660,700 | A | 8/1997 | Shimizu et al. | 6,019,284 | A | 2/2000 | Freeman et al. |
| 5,665,490 | A | 9/1997 | Takeuchi et al. | 6,023,610 | A | 2/2000 | Wood, Jr. |
| 5,667,538 | A | 9/1997 | Bailey | 6,024,844 | A | 2/2000 | Drummond et al. |
| 5,677,784 | A | 10/1997 | Harris | 6,025,094 | A | 2/2000 | Visco et al. |
| 5,679,980 | A | 10/1997 | Summerfelt | 6,028,990 | A | 2/2000 | Shahani et al. |
| 5,681,666 | A | 10/1997 | Treger et al. | 6,030,421 | A | 2/2000 | Gauthier et al. |
| 5,686,360 | A | 11/1997 | Harvey, III et al. | 6,033,768 | A | 3/2000 | Muenz et al. |
| 5,689,522 | A | 11/1997 | Beach | 6,042,965 | A | 3/2000 | Nestler et al. |
| 5,693,956 | A | 12/1997 | Shi et al. | 6,045,626 | A | 4/2000 | Yano et al. |
| 5,702,829 | A | 12/1997 | Paidassi et al. | 6,045,652 | A | 4/2000 | Tuttle et al. |
| 5,705,293 | A | 1/1998 | Hobson | 6,045,942 | A | 4/2000 | Miekka et al. |
| 5,716,728 | A | 2/1998 | Smesko | 6,046,081 | A | 4/2000 | Kuo |
| 5,718,813 | A | 2/1998 | Drummond et al. | 6,046,514 | A | 4/2000 | Rouillard et al. |
| 5,719,976 | A | 2/1998 | Henry et al. | 6,048,372 | A | 4/2000 | Mangahara et al. |
| 5,721,067 | A | 2/1998 | Jacobs et al. | 6,051,114 | A | 4/2000 | Yao et al. |
| RE35,746 | E | 3/1998 | Lake | 6,051,296 | A | 4/2000 | McCaulley et al. |
| 5,731,661 | A | 3/1998 | So et al. | 6,051,954 | A * | 4/2000 | Nagao et al. ................ 320/101 |
| 5,738,731 | A | 4/1998 | Shindo et al. | 6,052,397 | A | 4/2000 | Jeon et al. |
| 5,742,094 | A | 4/1998 | Ting | 6,057,557 | A | 5/2000 | Ichikawa |
| 5,755,938 | A | 5/1998 | Fukui et al. | 6,058,233 | A | 5/2000 | Dragone |
| 5,755,940 | A | 5/1998 | Shindo | 6,071,323 | A | 6/2000 | Kawaguchi |
| 5,757,126 | A | 5/1998 | Harvey, III et al. | 6,075,973 | A | 6/2000 | Greeff et al. |
| 5,762,768 | A | 6/1998 | Goy et al. | 6,077,106 | A | 6/2000 | Mish |
| 5,763,058 | A | 6/1998 | Isen et al. | 6,077,642 | A | 6/2000 | Ogata et al. |
| 5,771,562 | A | 6/1998 | Harvey, III et al. | 6,078,791 | A | 6/2000 | Tuttle et al. |
| 5,776,278 | A | 7/1998 | Tuttle et al. | 6,080,508 | A | 6/2000 | Dasgupta et al. |
| 5,779,839 | A | 7/1998 | Tuttle et al. | 6,080,643 | A | 6/2000 | Noguchi et al. |
| 5,790,489 | A | 8/1998 | O'Connor | 6,093,944 | A | 7/2000 | VanDover |
| 5,792,550 | A | 8/1998 | Phillips et al. | 6,094,292 | A | 7/2000 | Goldner et al. |
| 5,805,223 | A | 9/1998 | Shikakura et al. | 6,096,569 | A | 8/2000 | Matsuno et al. |
| 5,811,177 | A | 9/1998 | Shi et al. | 6,100,108 | A | 8/2000 | Mizuno et al. |
| 5,814,195 | A | 9/1998 | Lehan et al. | 6,106,933 | A | 8/2000 | Nagai et al. |
| 5,830,330 | A | 11/1998 | Lantsman | 6,110,531 | A | 8/2000 | Paz de Araujo et al. |
| 5,831,262 | A | 11/1998 | Greywall et al. | 6,115,616 | A | 9/2000 | Halperin et al. |
| 5,834,137 | A | 11/1998 | Zhang et al. | 6,117,279 | A | 9/2000 | Smolanoff et al. |
| 5,841,931 | A | 11/1998 | Foresi et al. | 6,118,426 | A | 9/2000 | Albert et al. |
| 5,842,118 | A | 11/1998 | Wood, Jr. | 6,120,890 | A | 9/2000 | Chen et al. |
| 5,845,990 | A | 12/1998 | Hymer | 6,129,277 | A | 10/2000 | Grant et al. |
| 5,847,865 | A | 12/1998 | Gopinath et al. | 6,133,670 | A | 10/2000 | Rodgers et al. |
| 5,849,163 | A | 12/1998 | Ichikawa et al. | 6,137,671 | A | 10/2000 | Staffiere |
| 5,851,896 | A | 12/1998 | Summerfelt | 6,144,916 | A | 11/2000 | Wood, Jr. et al. |
| 5,853,830 | A | 12/1998 | McCaulley et al. | 6,146,225 | A | 11/2000 | Sheats et al. |
| 5,855,744 | A | 1/1999 | Halsey et al. | 6,148,503 | A | 11/2000 | Delnick et al. |
| 5,856,705 | A | 1/1999 | Ting | 6,156,452 | A | 12/2000 | Kozuki et al. |
| 5,864,182 | A | 1/1999 | Matsuzaki | 6,157,765 | A | 12/2000 | Bruce et al. |
| 5,865,860 | A | 2/1999 | Delnick | 6,159,635 | A | 12/2000 | Dasgupta et al. |
| 5,870,273 | A | 2/1999 | Sogabe et al. | 6,160,373 | A | 12/2000 | Dunn et al. |
| 5,874,184 | A | 2/1999 | Takeuchi et al. | 6,162,709 | A | 12/2000 | Raoux et al. |
| 5,882,721 | A | 3/1999 | Delnick | 6,165,566 | A | 12/2000 | Tropsha |
| 5,882,946 | A | 3/1999 | Otani | 6,168,884 | B1 | 1/2001 | Neudecker et al. |
| 5,889,383 | A | 3/1999 | Teich | 6,169,474 | B1 | 1/2001 | Greeff et al. |
| 5,895,731 | A | 4/1999 | Clingempeel | 6,175,075 | B1 | 1/2001 | Shiotsuka et al. |
| 5,897,522 | A | 4/1999 | Nitzan | 6,176,986 | B1 | 1/2001 | Watanabe et al. |
| 5,900,057 | A | 5/1999 | Buchal et al. | 6,181,283 | B1 | 1/2001 | Johnson et al. |
| 5,909,346 | A | 6/1999 | Malhotra et al. | 6,192,222 | B1 | 2/2001 | Greeff et al. |
| 5,916,704 | A | 6/1999 | Lewin et al. | 6,197,167 | B1 | 3/2001 | Tanaka |
| 5,923,964 | A | 7/1999 | Li | 6,198,217 | B1 | 3/2001 | Suzuki et al. |
| 5,930,046 | A | 7/1999 | Solberg et al. | 6,204,111 | B1 | 3/2001 | Uemoto et al. |
| 5,930,584 | A | 7/1999 | Sun et al. | 6,210,544 | B1 | 4/2001 | Sasaki |
| 5,942,089 | A | 8/1999 | Sproul et al. | 6,210,832 | B1 | 4/2001 | Visco et al. |
| 5,948,215 | A | 9/1999 | Lantsman | 6,214,061 | B1 | 4/2001 | Visco et al. |
| 5,948,464 | A | 9/1999 | Delnick | 6,214,660 | B1 | 4/2001 | Uemoto et al. |
| 5,948,562 | A | 9/1999 | Fulcher et al. | 6,218,049 | B1 | 4/2001 | Bates et al. |
| 5,952,778 | A | 9/1999 | Haskal et al. | 6,220,516 | B1 | 4/2001 | Tuttle et al. |
| 5,955,217 | A | 9/1999 | Van Lerberghe | 6,223,317 | B1 | 4/2001 | Pax et al. |
| 5,961,672 | A | 10/1999 | Skotheim et al. | 6,228,532 | B1 | 5/2001 | Tsuji et al. |
| 5,961,682 | A | 10/1999 | Lee et al. | 6,229,987 | B1 | 5/2001 | Greeff et al. |
| 5,966,491 | A | 10/1999 | DiGiovanni | 6,232,242 | B1 | 5/2001 | Hata et al. |
| 5,970,393 | A | 10/1999 | Khorrami et al. | 6,235,432 | B1 | 5/2001 | Kono et al. |
| 5,973,913 | A | 10/1999 | McEwen et al. | 6,236,793 | B1 | 5/2001 | Lawrence et al. |
| 5,977,582 | A | 11/1999 | Fleming et al. | 6,242,128 | B1 | 6/2001 | Tura et al. |
| 5,982,144 | A | 11/1999 | Johnson et al. | 6,242,129 | B1 | 6/2001 | Johnson |
| 5,985,484 | A | 11/1999 | Young et al. | 6,242,132 | B1 | 6/2001 | Neudecker et al. |
| 5,985,485 | A | 11/1999 | Ovshinsky et al. | 6,248,291 | B1 | 6/2001 | Nakagama et al. |

| | | |
|---|---|---|
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata |
| 6,280,875 B1 | 8/2001 | Kwak et al. |
| 6,281,142 B1 | 8/2001 | Basceri et al. |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomll et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greef et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greef et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |
| 6,444,750 B1 | 9/2002 | Touhsaent |
| 6,459,418 B1 | 10/2002 | Comiskey et al. |
| 6,459,726 B1 | 10/2002 | Ovard et al. |
| 6,466,771 B2 | 10/2002 | Wood, Jr. |
| 6,475,668 B1 | 11/2002 | Hosokawa et al. |
| 6,480,699 B1 | 11/2002 | Lovoi |
| 6,481,623 B1 | 11/2002 | Grant et al. |
| 6,488,822 B1 | 12/2002 | Moslehi |
| 6,494,999 B1 | 12/2002 | Herrera et al. |
| 6,495,283 B1 | 12/2002 | Yoon et al. |
| 6,497,598 B2 | 12/2002 | Affinito |
| 6,500,287 B1 | 12/2002 | Azens et al. |
| 6,503,661 B1 | 1/2003 | Park et al. |
| 6,503,831 B2 | 1/2003 | Speakman |
| 6,506,289 B2 | 1/2003 | Demaray et al. |
| 6,511,516 B1 | 1/2003 | Johnson et al. |
| 6,511,615 B1 | 1/2003 | Dawes et al. |
| 6,517,968 B2 | 2/2003 | Johnson et al. |
| 6,522,067 B1 | 2/2003 | Graff et al. |
| 6,524,466 B1 | 2/2003 | Bonaventura et al. |
| 6,524,750 B1 | 2/2003 | Mansuetto |
| 6,525,976 B1 | 2/2003 | Johnson |
| 6,528,212 B1 | 3/2003 | Kusumoto et al. |
| 6,529,827 B1 | 3/2003 | Beason et al. |
| 6,533,907 B2 | 3/2003 | Demaray et al. |
| 6,537,428 B1 | 3/2003 | Xiong et al. |
| 6,538,211 B2 | 3/2003 | St. Lawrence et al. |
| 6,541,147 B1 | 4/2003 | McLean et al. |
| 6,548,912 B1 | 4/2003 | Graff et al. |
| 6,551,745 B2 | 4/2003 | Moutsios et al. |
| 6,558,836 B1 | 5/2003 | Whitacre et al. |
| 6,562,513 B1 | 5/2003 | Takeuchi et al. |
| 6,563,998 B1 | 5/2003 | Farah et al. |
| 6,569,564 B1 | 5/2003 | Lane |
| 6,569,570 B2 | 5/2003 | Sonobe et al. |
| 6,570,325 B2 | 5/2003 | Graff et al. |
| 6,572,173 B2 | 6/2003 | Muller |
| 6,573,652 B1 | 6/2003 | Graff et al. |
| 6,576,546 B2 | 6/2003 | Gilbert et al. |
| 6,579,728 B2 | 6/2003 | Grant et al. |
| 6,582,480 B2 | 6/2003 | Pasquier et al. |
| 6,582,481 B1 | 6/2003 | Erbil |
| 6,582,852 B1 | 6/2003 | Gao et al. |
| 6,589,299 B2 | 7/2003 | Missling et al. |
| 6,593,150 B2 | 7/2003 | Ramberg et al. |
| 6,599,662 B1 | 7/2003 | Chiang et al. |
| 6,600,905 B2 | 7/2003 | Greeff et al. |
| 6,602,338 B2 | 8/2003 | Chen et al. |
| 6,603,139 B1 | 8/2003 | Tessler et al. |
| 6,603,391 B1 | 8/2003 | Greeff et al. |
| 6,605,228 B1 | 8/2003 | Kawaguchi et al. |
| 6,608,464 B1 | 8/2003 | Lew et al. |
| 6,608,470 B1 | 8/2003 | Oglesbee et al. |
| 6,610,440 B1 | 8/2003 | LaFollette et al. |
| 6,615,614 B1 | 9/2003 | Makikawa et al. |
| 6,616,035 B2 | 9/2003 | Ehrensvard et al. |
| 6,618,829 B2 | 9/2003 | Pax et al. |
| 6,620,545 B2 | 9/2003 | Goenka et al. |
| 6,622,049 B2 | 9/2003 | Penner et al. |
| 6,632,563 B1 | 10/2003 | Krasnov et al. |
| 6,637,906 B2 | 10/2003 | Knoerzer et al. |
| 6,637,916 B2 | 10/2003 | Mullner |
| 6,639,578 B1 | 10/2003 | Comiskey et al. |
| 6,642,895 B2 | 11/2003 | Zurcher et al. |
| 6,645,675 B1 | 11/2003 | Munshi |

| | | |
|---|---|---|
| 6,650,000 B2 | 11/2003 | Ballantine et al. |
| 6,650,942 B2 | 11/2003 | Howard et al. |
| 6,662,430 B2 | 12/2003 | Brady et al. |
| 6,664,006 B1 | 12/2003 | Munshi |
| 6,673,484 B2 | 1/2004 | Matsuura |
| 6,673,716 B1 | 1/2004 | D'Couto et al. |
| 6,674,159 B1 | 1/2004 | Peterson et al. |
| 6,677,070 B2 | 1/2004 | Kearl |
| 6,683,244 B2 | 1/2004 | Fujimori et al. |
| 6,683,749 B2 | 1/2004 | Daby et al. |
| 6,686,096 B1 | 2/2004 | Chung |
| 6,693,840 B2 | 2/2004 | Shimada et al. |
| 6,700,491 B2 | 3/2004 | Shafer |
| 6,706,449 B2 | 3/2004 | Mikhaylik et al. |
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jenson et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jenson |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 7,848,715 B2 | 12/2010 | Boos |
| 7,858,223 B2 | 12/2010 | Visco et al. |
| 8,010,048 B2 | 8/2011 | Brommer et al. |
| 8,056,814 B2 | 11/2011 | Martin et al. |
| 2001/0005561 A1 | 6/2001 | Yamada et al. |
| 2001/0027159 A1 | 10/2001 | Kaneyoshi |
| 2001/0031122 A1 | 10/2001 | Lackritz et al. |
| 2001/0032666 A1 | 10/2001 | Jenson |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |

| | | |
|---|---|---|
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 | 2/2003 | Zurcher et al. |
| 2003/0035906 A1 | 2/2003 | Memarian et al. |
| 2003/0036003 A1 | 2/2003 | Shchori et al. |
| 2003/0042131 A1 | 3/2003 | Johnson |
| 2003/0044665 A1 | 3/2003 | Rastegar et al. |
| 2003/0048635 A1 | 3/2003 | Knoerzer et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0058237 A1 | 3/2004 | Higuchi et al. |
| 2004/0072067 A1 | 4/2004 | Minami et al. |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0155545 A1 | 7/2006 | Janye |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0255769 A1* | 11/2006 | Liu et al. .................. 320/134 |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0216369 A1* | 9/2007 | Chandler .................. 320/136 |
| 2007/0222681 A1 | 9/2007 | Greene et al. |
| 2007/0224951 A1 | 9/2007 | Gilb et al. |
| 2007/0229228 A1 | 10/2007 | Yamazaki et al. |
| 2007/0235320 A1 | 10/2007 | White et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |
| 2008/0003496 A1 | 1/2008 | Neudecker et al. |
| 2008/0008936 A1 | 1/2008 | Mizuta et al. |
| 2008/0014501 A1 | 1/2008 | Skotheim et al. |
| 2008/0057397 A1 | 3/2008 | Skotheim et al. |
| 2008/0150829 A1 | 6/2008 | Lin et al. |
| 2008/0213672 A1 | 9/2008 | Skotheim et al. |
| 2008/0233708 A1 | 9/2008 | Hisamatsu |

| | | | | | | |
|---|---|---|---|---|---|---|
| 2008/0254575 | A1 | 10/2008 | Fuergut et al. | KR | 20030033913 | 5/2003 |
| 2008/0261107 | A1 | 10/2008 | Snyder et al. | KR | 20030042288 | 5/2003 |
| 2008/0263855 | A1 | 10/2008 | Li et al. | KR | 20030085252 | 11/2003 |
| 2008/0286651 | A1 | 11/2008 | Neudecker et al. | RU | 2241281 | 11/2004 |
| 2009/0085404 | A1* | 4/2009 | Suzuki et al. ............... 307/46 | WO | WO 9513629 | 5/1995 |
| 2009/0092903 | A1 | 4/2009 | Johnson et al. | WO | WO 9623085 | 1/1996 |
| 2009/0124201 | A1 | 5/2009 | Meskens | WO | WO 9623217 | 8/1996 |
| 2009/0181303 | A1 | 7/2009 | Neudecker et al. | WO | WO 9727344 | 7/1997 |
| 2009/0302226 | A1 | 12/2009 | Schieber et al. | WO | WO 9735044 | 9/1997 |
| 2009/0308936 | A1 | 12/2009 | Nitzan et al. | WO | WO 9847196 | 10/1998 |
| 2009/0312069 | A1 | 12/2009 | Peng et al. | WO | WO 9943034 | 8/1999 |
| 2010/0001079 | A1 | 1/2010 | Martin et al. | WO | WO 9957770 | 11/1999 |
| 2010/0032001 | A1 | 2/2010 | Brantner | WO | WO 0021898 | 4/2000 |
| 2010/0086853 | A1 | 4/2010 | Venkatachalam et al. | WO | WO 0022742 | 4/2000 |
| 2011/0037435 | A1* | 2/2011 | Funabashi et al. ............ 320/136 | WO | WO 0028607 | 5/2000 |
| 2011/0267235 | A1 | 11/2011 | Brommer et al. | WO | WO 0036665 | 6/2000 |
| 2011/0304430 | A1 | 12/2011 | Brommer et al. | WO | WO 0060682 | 10/2000 |
| | | | | WO | WO 0060689 | 10/2000 |
| | | FOREIGN PATENT DOCUMENTS | | WO | WO 0062365 | 10/2000 |
| CN | | 1532984 | 9/2004 | WO | WO 0101507 | 1/2001 |
| DE | | 19824145 | 12/1999 | WO | WO 0117052 | 3/2001 |
| DE | | 10 2005 014 427 | 9/2006 | WO | WO 0124303 | 4/2001 |
| DE | | 10 2006 054 309 | 11/2006 | WO | WO 0133651 | 5/2001 |
| DE | | 10 2008 016 665 | 10/2008 | WO | WO 0139305 | 5/2001 |
| DE | | 10 2007 030604 | 1/2009 | WO | WO 0173864 | 10/2001 |
| EP | | 0 510 883 | 10/1992 | WO | WO 0173865 | 10/2001 |
| EP | | 0 639 655 | 2/1995 | WO | WO 0173866 | 10/2001 |
| EP | | 0 652 308 | 5/1995 | WO | WO 0173868 | 10/2001 |
| EP | | 0 820 088 | 1/1998 | WO | WO 0173870 | 10/2001 |
| EP | | 1 068 899 | 1/2001 | WO | WO 0173883 | 10/2001 |
| EP | | 0 867 985 | 2/2001 | WO | WO 0173957 | 10/2001 |
| EP | | 1 092 689 | 4/2001 | WO | WO 0182390 | 11/2001 |
| EP | | 1 189 080 | 3/2002 | WO | WO 0212932 | 2/2002 |
| EP | | 1 713 024 | 10/2006 | WO | WO 0242516 | 5/2002 |
| FR | | 2 861 218 | 4/2005 | WO | WO 0247187 | 6/2002 |
| FR | | 2806198 | 9/2011 | WO | WO 02071506 | 9/2002 |
| JP | | 55-009305 | 1/1980 | WO | WO 02101857 | 12/2002 |
| JP | | 56-076060 | 6/1981 | WO | WO 03003485 | 1/2003 |
| JP | | 56-156675 | 12/1981 | WO | WO 03005477 | 1/2003 |
| JP | | 60-068558 | 4/1985 | WO | WO 03026039 | 3/2003 |
| JP | | 61-269072 | 11/1986 | WO | WO 03036670 | 5/2003 |
| JP | | 62-267944 | 11/1987 | WO | WO 03069714 | 8/2003 |
| JP | | 63-290922 | 11/1988 | WO | WO 03080325 | 10/2003 |
| JP | | 2000-162234 | 11/1988 | WO | WO 03083166 | 10/2003 |
| JP | | 2-054764 | 2/1990 | WO | WO 2004012283 | 2/2004 |
| JP | | 2-230662 | 9/1990 | WO | WO 2004021532 | 3/2004 |
| JP | | 03-036962 | 2/1991 | WO | WO 2004061887 | 7/2004 |
| JP | | 4-058456 | 2/1992 | WO | WO 2004077519 | 9/2004 |
| JP | | 4-072049 | 3/1992 | WO | WO 2004086550 | 10/2004 |
| JP | | 6-010127 | 1/1994 | WO | WO 2004093223 | 10/2004 |
| JP | | 6-100333 | 4/1994 | WO | WO 2004106581 | 12/2004 |
| JP | | 7-233469 | 5/1995 | WO | WO 2004106582 | 12/2004 |
| JP | | 7-224379 | 8/1995 | WO | WO 2005008828 | 1/2005 |
| JP | | 08-114408 | 5/1996 | WO | WO 2005013394 | 2/2005 |
| JP | | 10-026571 | 1/1998 | WO | WO 2005038957 | 4/2005 |
| JP | | 10-239187 | 9/1998 | WO | WO 2005067645 | 7/2005 |
| JP | | 11-204088 | 7/1999 | WO | WO 2005085138 | 9/2005 |
| JP | | 2000-144435 | 5/2000 | WO | WO 2005091405 | 9/2005 |
| JP | | 2000-188099 | 7/2000 | WO | WO 2006063308 | 6/2006 |
| JP | | 2000-268867 | 9/2000 | WO | WO 2006085307 | 8/2006 |
| JP | | 2001-171812 | 6/2001 | WO | WO 2007016781 | 2/2007 |
| JP | | 2001-259494 | 9/2001 | WO | WO 2007027535 | 3/2007 |
| JP | | 2001-297764 | 10/2001 | WO | WO 2007095604 | 8/2007 |
| JP | | 2001-328198 | 11/2001 | WO | WO 2008036731 | 3/2008 |
| JP | | 2002-140776 | 5/2002 | WO | WO 2007019855 | 9/2011 |
| JP | | 2002-344115 | 11/2002 | | | |
| JP | | 2003-17040 | 1/2003 | | OTHER PUBLICATIONS | |
| JP | | 2003-347045 | 12/2003 | | | |
| JP | | 2004-071305 | 3/2004 | Abrahams, I., "Li6Zr2O7, a new anion vacancy ccp based structure, determined by ab initio powder diffraction methods," 104 J. Solid State Chem. 397-403 (1993). | | |
| JP | | 2004-149849 | 5/2004 | | | |
| JP | | 2004-158268 | 6/2004 | | | |
| JP | | 2004-273436 | 9/2004 | Affinito, J.D. et al., "PML/oxide/PML barrier layer performance differences arising from use of UV or electron beam polymerization of the PML layers," Thin Films 308-309: 19-25 (1997). | | |
| JP | | 2005-256101 | 9/2005 | | | |
| JP | | 2002-026412 | 2/2007 | | | |
| JP | | 7-107752 | 4/2007 | Affinito, J.D. et al., "Polymer-oxide transparent barrier layers," Society of Vacuum Coaters, 39th Ann. Technical Conference Proceedings, May 5-10, 1996, Philadelphia, PA, pp. 392-397 (1996). | | |
| KR | | 20020007881 | 1/2002 | | | |
| KR | | 20020017790 | 3/2002 | | | |
| KR | | 20020029813 | 4/2002 | Alder, T. et al., "High-efficiency fiber-to-chip coupling using low- | | |
| KR | | 20020038917 | 5/2002 | | | | loss tapered single-mode fiber," IEEE Photonics Tech. Lett. 12(8): 1016-1018 (2000).
Almeida, V.R. et al., "Nanotaper for compact mode conversion," Optics Letters 28(15): 1302-1304 (2003).
Amatucci, G. et al., "Lithium scandium phosphate-based electrolytes for solid state lithium rechargeable microbatteries," 60 Solid State Ionics 357-65 (1993).
Anh et al., "Significant Suppression of Leakage Current in (Ba,Sr)TiO3 Thin Films by Ni or Mn Doping," J. Appl. Phys.,92(5): 2651-2654 (Sep. 2002).
Appetecchi, G.B. et al., "Composite polymer electrolytes with improved lithium metal electrode interfacial properties," 145(12) J. Electrochem. Soc. 4126-32 (1998).
Asghari, M. and Dawnay, E., "ASOC™—a manufacturing integrated optics technology," SPIE 3620: 252-262 (Jan. 1999).
Barbier, D. et al., "Amplifying four-wavelength combiner, based on erbium/ytterbium-doped waveguide amplifiers and integrated splitters," IEEE Photonics Tech. Lett. 9:315-317 (1997).
Barbier, D., "Performances and potential applications of erbium doped planar waveguide amplifiers and lasers," Proc. OAA, Victoria, BC, Canada, pp. 58-63 (Jul. 21-23, 1997).
Bates et al., "Thin-Film Lithium Batteries" in New Trends in Electrochemical Technology: Energy Storage Systems for Electronics (T. Osaka & M. Datta eds. Gordon and Breach 2000).
Bates, J.B. et al., "Electrical properties of amorphous lithium electrolyte thin films," 53-56 Solid State Ionics 647-54 (1992).
Beach R.J., "Theory and optimization of lens ducts," Applied Optics 35(12): 2005-2015 (1996).
Belkind, A. et al., "Pulsed-DC Reactive Sputtering of Dielectrics: Pulsing Parameter Effects," $43^{rd}$ Annual Technical Conference Proceedings (2000).
Belkind, A. et al., "Using pulsed direct current power for reactive sputtering of $Al_2O_3$," J. Vac. Sci. Technol. A 17(4): 1934-1940 (1999).
Bestwick, T., "ASOC™ silicon integrated optics technology," SPIE 3631: 182-190 (1999).
Borsella, E. et al., "Structural incorporation of silver in soda-lime glass by the ion-exchange process: a photoluminescence spectroscopy study," Applied Physics A 71: 125-132 (2000).
Byer, R.L., "Nonlinear optics and solid-state lasers: 2000," IEEE J. Selected Topics in Quantum Electronics 6(6): 911-930 (2000).
Campbell, S.A. et al., "Titanium dioxide (TiO2)-based gate insulators," IBM J. Res. Develop. 43(3): 383-392 (1999).
Chang, C.Y. and Sze, S.M. (eds.), in ULSI Technology, The McGraw-Hill Companies, Inc., Nyew York, Chapter 4, pp. 169-170 and 226-231 (1996).
Chen, G. et al., "Development of supported bifunctional electrocatalysts for unitized regenerative fuel cells," J. Electrochemical Society 149(8): A1092-A1099 (2002).
Choi, Y.B. et al., "Er-Al-codoped silicate planar light waveguide-type amplifier fabricated by radio-frequency sputtering," Optics Letters 25(4): 263-265 (2000).
Choy et al., "Eu-Doped Y2O3 Phosphor Films Produced by Electrostatic-Assisted Chemical Vapor Deposition," J. Mater. Res. 14(7): 3111-3114 (Jul. 1999).
Cocorullo, G. et al., "Amorphous silicon waveguides and light modulators for integrated photonics realized by low-temperature plasma-enhanced chemical-vapor deposition," Optics Lett. 21(24): 2002-2004 (1996).
Cooksey, K. et al., "Predicting permeability & Transmission rate for multilayer materials," Food Technology 53(9): 60-63 (1999).
Crowder, M.A. et al., "Low-temperature single-crystal Si TFT's fabricated on Si films processed via sequential lateral solidification," IEEE Electron Device Lett. 19(8): 306-308 (1998).
Delavaux, J-M. et al., "Integrated optics erbium ytterbium amplifier system in 10Gb/s fiber transmission experiment," $22^{nd}$ European Conference on Optical Communication, Osla, 1.123-1.126 (1996).
Delmas, C. et al., "Des conducteurs ioniques pseudo-bidimensionnels Li8MO6 (M=Zr, Sn), Li7LO6 (L=Nb, Ta) et Li6In2O6," 14 Mat. Res. Bull. 619-25 (1979).
Distributed Energy Resources: Fuel Cells, Projects, 4 pages http://www.eere.energy.gov/der/fuel_cells/projects.html (2003).

Dorey, R.A., "Low temperature micromoulding of functional ceramic devices," Grant summary for GR/S84156/01 for the UK Engineering and Physical Sciences Research Council, 2 pages (2004).
DuPont Teijin Films, Mylar 200 SBL 300, Product Information, 4 pages (2000).
Electrometals Technologies Limited, Financial Report for 2002, Corporate Directory, Chairman's review, Review of Operations, 10 pages (2002).
E-Tek website: FAQ, Inside E-Tek, E-TEk News, Products; http://www.etek-inc.com/, 10 pages (2003).
Flytzanis, C. et al., "Nonlinear optics in composite materials," in Progress in Optics XXIX, Elsevier Science Publishers B.V., pp. 323-425 (1991).
Frazao, O. et al., "EDFA gain flattening using long-period fibre gratings based on the electric arc technique," Proc. London Comm. Symp. 2001, London, England, 3 pages (2001).
Fujii, M. et al., "1.54 μm photoluminescence of $Er^{3+}$ doped into $SiO_2$ films containing Si nanocrystals: evidence for energy transfer from Si nanocrystals for $Er^{3+}$," Appl. Phys. Lett. 71(9): 1198-1200 (1997).
Garcia, C. et al., "Size dependence of lifetime and absorption cross section of Si nanocrystals embedded in $SiO_2$," Appl. Phys. Lett. 82(10): 1595-1597 (2003).
Goossens, A. et al., "Sensitization of $TiO_2$ with p-type semiconductor polymers," Chem. Phys. Lett. 287: 148 (1998).
Greene, J.E. et al., "Morphological and electrical properties of rf sputtered $Y_2O_3$-doped $ZrO_2$ thin films," J. Vac. Sci. Tech. 13(1): 72-75 (1976).
Han, H.-S. et al., "Optical gain at 1.54 μm in Erbium-doped Silicon nanocluster sensitized waveguide," Appl. Phys. Lett. 79(27): 4568-4570 (2001).
Hayakawa, T. et al., "Enhanced fluorescence from $Eu^{3+}$ owing to surface plasma oscillation of silver particles in glass," J. Non-Crystalline Solids 259: 16-22 (1999).
Hayakawa, T. et al., "Field enhancement effect of small Ag particles on the fluorescence from $Eu^{3+}$-doped $SiO_2$ glass," Appl. Phys. Lett. 74(11): 1513-1515 (1999).
Hayfield, P.C.S., I Development of a New Material-Monolithic $Ti_4O_7$ Ebonix® Ceramic, Royal Society of Chemistry, Cambridge, Table of Contents, 4 pages (2002).
Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).
Hehlen, M.P. et al., "Uniform upconversion in high-concentration $Er^{3+}$-doped soda lime silicate and aluminosilicate glasses," Optics Letters 22(11); 772-774 (1997).
Horst, F. et al., "Compact, tunable optical devices in silicon-oxynitride waveguide technology," Top. Meeting Integrated Photonics Res. '00, Quebec, Canada, p. IThF1, 3 pages (2000).
Howson, R.P., "The reactive sputtering of oxides and nitrides," Pure & Appl. Chem. 66(6): 1311-1318 (1994).
Hu, Y-W. et al,, "Ionic conductivity of lithium phosphate-doped lithium orthosilicate," 11 Mat. Res. Bull. 1227-30 (1976).
Hubner, J. and Guldberg-Kjaer, S., "Planar Er- and Yb-doped amplifiers and lasers," COM Technical University of Denmark, $10^{th}$ European Conf. on Integrated Optics, Session WeB2, pp. 71-74 (2001).
Hwang et al., "Characterization of sputter-deposited LiMn2O4 thin films for rechargeable microbatteries," 141(12) J. Electrochem. Soc. 3296-99 (1994).
Hwang, M-S. et al., "The effect of pulsed magnetron sputtering on the properties of iridium tin oxide thin films," Surface and Coatings Tech. 171: 29-33 (2003).
Im, J.S. and Sposili, R.S., "Crystalline Si films for integrated active-matrix liquid crystal displays," MRS Bulletin, pp. 39-48 (1996).
Im, J.S. et al., "Controlled super-lateral growth of Si-films for microstructural manipulation and optimization," Physica Status Solidi (A) 166(2): 603-617 (1998).
Im, J.S. et al., "Single-crystal Si films for thin-film transistor devices," Appl. Physics Lett. 70(25): 3434-3436 (1997).
Itoh, M. et al., "Large reduction of singlemode-fibre coupling loss in 1.5% Δ planar lightwave circuits using spot-size converters," Electronics Letters 38(2): 72-74 (2002).

Jackson, M.K. and Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 Pages (1999).

Lange, M.R. et al, "High Gain Ultra-Short Length Phosphate glass Erbium-Doped Fiber Amplifier Material," OSA Optical Fiber Communications (OFC), 3 Pages (2002).

Laporta, P. et al, "Diode-pumped cw bulk Er:Yb: glass laser," Optics Letters 16(24):1952-1954 (1991).

Laurent-Lund, C. et al., "PECVD Grown Mulitple Core Planar Wageguides with Extremely Low Interface Reflections and Losses," IEEE Photonics Tech. Lett. 10(10):1431-1433 (1998).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Meijerink, A. et al, "Luminescence of $Ag^+$ in Crystalline and Glassy $Srb_4O_7$," J. Physics Chem. Solids 54(8):901-906 (1993).

Mesnaoui, M. et al, "Spectroscopic properties of $Ag^+$ ions in phosphate glasses of $NaPO_3$-$AgPO_3$ system," Eur. J. Solid State Inorg. Chem. 29:1001-1013 (1992).

Mitomi, O. et al., "Design of a Single-Mode Tapered Waveguide for Low-Loss Chipto-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Neudecker, B. et al., "Li9SiAlO8: a lithium ion electrolyte for voltages above 5.4 V," 143(7) J. Electrochem. Soc. 2198-203 (1996).

Sarro, P., "Silicon Carbide as a New MEMS Technology," Sensors and Actuators 82, 210-218 (2000).

Hwang et al., "Characterization of Sputter-Deposited $LiMn_2O_4$ Thin Films for Rechargeable Microbatteries," 141(12) J. Electrochem. Soc. 3296-99 (1994).

Jones et al., 53-56 Solid State Ionics 628 (1992).

Mattox "Handbook of Physical Vapor Deposition (PVD) Processing, Society of Vacuum Coaters," Albuquerque, New Mexico 660f and 692ff, Noyes Publications (1998).

Dobkin, D.M., "Silicon Dioxide: Properties and Applications".

Ohkubo, H. et al., Polarization-Insensitive Arrayed-Waveguide Grating Using Pure $SiO_2$ Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 Page (2004).

Ohno, H. et al., "Electrical conductivity of a sintered pellet of octalithium zirconate," 132 J. Nucl. Mat. 222-30 (1985).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar $Er^{3+}$-doped aluminosilicate waveguide amplifier with more than 10 dB gain across C-band, " Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton , Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).

Shin, J.C. et al. "Dielectric and Electrical Properties of Sputter Grown $(Ba,Se)TiO_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Strohhofer, C. and Polman, A. "Energy transfer to $Er^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited $SiO_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. and West, A.R., "Electronic Conductivity of $LiCoO_2$ and its Enhancement by Magnesium Doping," J. Electrochem. Soc 144(9):3164-3168 (1997).

Van Dover, R.B., "Amorphous Lanthanide-Doped $TiO_x$ Dielectric Films," Appl. Phys. Lett. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the 11th Int'l Conference of Solid State Ionics, Honolulu, Hawaii, Nov. 19, 1997, Published in Solid State Ionics 113-115:425-430. (1998).

Wang, B. et al., "Characterization of Thin-Film Rechargeable Lithium Batteries with Lithium Cobalt Oxide Cathodes," J. Electrochem. Soc. 143:3203-13 (1996).

Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Yu, X. et al., "A stable thin-film lithium electrolyte: lithium phosphorus oxynitride," 144(2) J. Electrochem. Soc. 524-532 (1997).

Zhang, H. et al., "High Dielectric Strength, High k $TiO_2$ Films by Pulsed DC, Reactive Sputter Deposition," 5 pages (2001).

Hill, R. et al., "Large Area Deposition by Mid-Frequency AC Sputtering," Society of Vacuum Coaters, 41st Annual Tech. Conference Proceedings, 197-202 (1998).

Macák, Karol et al, "Ionized Sputter Deposition Using an Extremely High Plasma Density Pulsed Magnetron Discharge," J. Vac. Sci. Technol. A 18(4):1533-37 (2000).

Balanis, Constantine A., "Antenna Theory: Analysis and Design," 3rd Ed., pp. 817-820 (John Wiley & Sons, Inc. Publication, 2005).

Inaguma, Yoshiyuki, "High Ionic Conductivity in Lithium Lanthanum Titanate," Solid State Communications, vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Balanis, Constantine A., "Antenna Theory: Analysis and Design," 3rd Ed., pp. 811-820 (2005).

Jones and Akridge, "A thin film solid state microbattery," Solid State Ionics 53-56 (1992), pp. 628-634.

* cited by examiner

PASSIVE OVER/UNDER VOLTAGE CONTROL AND PROTECTION FOR ENERGY STORAGE DEVICES ASSOCIATED WITH ENERGY HARVESTING

RELATED APPLICATIONS

This application is related to and claims the benefit under 35 U.S.C. §119 of U.S. provisional patent application Ser. No. 61/103,746, entitled "Environmentally-Powered Wireless Sensor Module," filed on Oct. 8, 2008 and U.S. provisional patent application Ser. No. 61/041,841, entitled "Passive Battery or Capacitor Overvoltage Control and Protection Circuit," filed on Apr. 2, 2008; both of which are incorporated herein by reference in their entirety.

TECHNICAL FIELD AND BACKGROUND OF THE INVENTION

This invention relates to, for example, an apparatus, method, and system for safely utilizing a rechargeable energy device.

Some energy storage devices such as, for example, thin-film solid electrolyte batteries or capacitors may be susceptible to damage when exposed to continuous or momentary influxes of high charging voltages. Batteries may, for example, be damaged if discharged beyond their design parameters.

Over-charge protection relates to a condition when a relative large voltage is allowed at the input to a battery cell or capacitor for an any time period. In order to protect against overcharge, device protection circuits may be used to monitor the current and voltage and inhibit battery charge when overcharge is sensed.

Under-voltage conditions also have the potential to damage the energy storage device. In a battery, for example, during an under-voltage condition the battery may discharge beyond the point of recovery.

Thus, a need exists to protect an energy storage device from over-charge and/or over-discharge conditions.

To implement the functionality mentioned above, the current available art may generally require power consumption from the device to be charged for the over-charge circuitry. That is, the existing art may involve circuits using quiescent current from the battery or capacitor to be charged. Also, current known art may involve switching to disable the charging source when an overcharge condition exists despite the absence of a charging source or similar energy being present. Other known over voltage control circuits use voltage regulation schemes that clamp input power to a known voltage prior to input to the energy storage device to be charged. These may use a significant amount of power either from the rechargeable device or from input power to the system. These mechanisms may not be ideal because, for example, they increase the amounts of leakage current taken from the battery or capacitor to be charged or use input energy that may be otherwise allowed into the rechargeable energy storage device.

Additionally, a demand exists for an electronic device that, for example, does not require excess storage device requirements and may be able to gather energy efficiently, even including very trace amounts of energy, without, for example, damage during operation or the recharging process, either by over-voltage or under-voltage.

Further, there is a perceived need for an over-voltage and/or under-voltage protection circuit that, for example, does not operate using significant quiescent current from the energy storage device, nor essentially load or waste input charge energy with regulation when regulation is not necessary, thus consuming less energy from both the rechargeable energy storage device and the available input charge energy.

SUMMARY OF THE INVENTION

Various aspects and embodiments of the present invention, as described in more detail and by example below, address certain of the shortfalls of the background technology and emerging needs in the relevant industries. Accordingly, the present invention is directed, for example, to substantially obviate one or more of the shortcomings or problems due to the limitations and disadvantages of the related art.

Ambient energy exists in many forms and may be in many cases in useable but potentially unreliable quantities, providing an opportunity to convert this energy into a beneficial electrical form, with the assistance of an energy harvesting device combined with a passive over-voltage and/or under-voltage control protection circuit. Depending on the application, harvested energy may, for example, be used instantaneously or stored in an energy storage device such as a capacitor or a thin-film battery directly, with no active voltage control necessarily required, and used at defined time intervals or when certain environmental conditions exist, such as when a request by an attached or a remotely connected device is received.

It is one object of certain exemplary embodiments of this invention to use an energy harvester (such as, for example, a piezoelectric mechanism or an energy-absorbing antenna), adjacently connected or incorporated onto a flexible substrate or a chip, to collect energy from one or more non-conventional sources and supply a charge energy to recharge an energy storage device such as a capacitor or battery.

Another object of an embodiment of this invention relates to, for example, a device which may be used to recharge energy storage devices without subjecting the device to potentially damaging over-charge or under-voltage conditions while using minimal power from the rechargeable device and taking minimal power from the available charge energy. This may, for example, allow maximum usage of available input power to the rechargeable device.

As some energy storage devices, such as, for example, thin-film solid electrolyte batteries, are sensitive to continuous or momentary influxes of high charging voltages, the over-charge and/or under-voltage circuitry may be especially useful in recharging the batteries in a safe manner. This may be particularly important, for example, in applications where energy storage devices are located in remote areas that require high reliability—the energy-harvesting system described above may recharge the energy storage devices and the over-charge and/or over-discharge circuitry may ensure that the energy storage device is not damaged by the excess and/or inadequate conditions of the charging voltage or load demand.

Certain embodiments of the present invention may, for example, limit power usage from the energy storage device to be charged by monitoring voltage levels when a charging source energy is present. A power dissipation circuit may, for example, be switched on in the event that a) charging energy is present, and b) the level of the energy present from the input charge device is greater than a predetermined safe level for the device to be charged. A further benefit of this invention may be that very small energy sources may, for example, preferably be safely connected to this circuit without the need of any voltage regulation because regulation may, for example, be applied via this circuit only in the event of possible over charge voltage conditions as seen at the rechargeable device, and only when charge energy is present.

The monitor and power dissipation circuitry in this invention can, for example, be powered solely by charging energy. If charging energy is not available, then only very minute amounts of leakage current may be taken from the energy storage device. Furthermore, only very small amounts of charge energy may be used to determine if an over voltage condition exists.

Also in this invention, the power dissipation circuit may be switched on, for example, when an over-voltage condition exists. The existence of such condition is determined, for example, when a) charging energy is present, and b) the voltage level of the energy present from the input charge device is greater than a predetermined safe level for the device to be charged. When the over voltage condition has been removed, the protection circuit may return to a quiescent state. Because over-voltage can, for example, preferably be monitored within this circuitry, maximum voltage regulation does not have to be provided via the charge energy source. This power may, for example, be dissipated by the power dissipation circuitry.

Trace energy gathering may slowly build to an overcharge condition over time. In some ambient environments, it may be critical to use all available energy without the power consumption of constant regulation. Certain embodiments of this invention may be different than the prior art in that, for example, voltage regulation may not, in those embodiments, occur unless an overcharge condition can exist at the rechargeable energy storage device, and only when recharge energy is present.

BRIEF DESCRIPTION OF THE DRAWINGS

Some features and advantages of certain embodiments of the invention are described with reference to the drawings of certain preferred embodiments, which are intended to illustrate examples and not to limit the full scope of the invention.

The accompanying drawings, which are included to provide a further understanding of various embodiments of the invention are incorporated in and constitute a part of this specification, and illustrate exemplary embodiments of the invention that together with the description serve to explain certain principles of the invention. In the drawings.

DETAILED DESCRIPTION OF THE PREFERRED EMBODIMENTS

These and other aspects of the invention will now be described in greater detail in connection with exemplary embodiments that are illustrated in the accompanying drawings.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

All patents and other publications identified are incorporated herein by reference for the purpose of describing and disclosing. For example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

Figure 1:
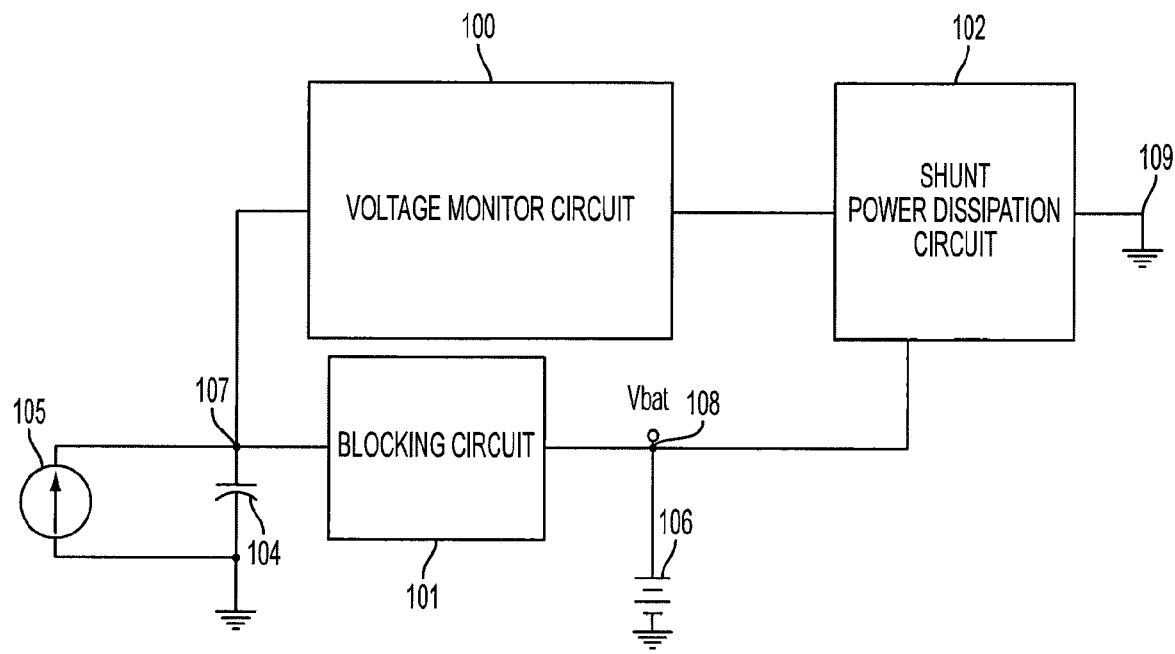
FIG. 1 is a block diagram of an exemplary embodiment of a passive battery or capacitor over voltage control and protection circuit.

FIG. 1 is a block diagram of an exemplary embodiment of a passive battery or capacitor over voltage control and protection circuit. In this embodiment, an input charge device 105 may be coupled to an impedance matching capacitor 104. The input charge device 105 may be, for example, a piezo electric source coupled to a rectifier and filter such that pulse energy is obtained via vibration, flexing, or impact events and generate a voltage across capacitor 104. Impedance matching capacitor(s) 104 of certain of these embodiments are application specific and can be chosen for the charge source. Voltage Monitor Circuit 100 and Blocking Circuit 101 may be connected to the same input node 107. The battery or capacitor or other energy storage device to be charged 106 may be connected to the output node 108 of the Blocking Circuit 101. Also, the input of a Shunt Power Dissipation Circuit 102 may be connected to the energy storage device 106 while the output Shunt Power Dissipation Circuit 102 may be connected to node 109. In the exemplary embodiment illustrated in FIG. 1, node 109 is connected to ground, but in other embodiments, node 109 may be connected to other items, such as an energy storage device. The Shunt Power Dissipation Circuit 102 may also be connected to the output node of Voltage Monitor Circuit 100. In this configuration, a signal from Voltage Monitor Circuit 100 may, for example, cause Shunt Power Dissipation Circuit 102 to operate.

In several embodiments, an input charge device 105 may be an energy harvesting mechanism based on a radio frequency energy transducer or a device that can convert solar power, wind power, vibration, pedestrian activity such as walking or jogging, water movement, temperature variations, magnetic fields, or rotational movements into usable energy such as electricity. Additionally, input charge device 105 may also include a voltage boost converter.

In addition to a battery or capacitor, an energy storage device 106 may also be a mechanical energy storage device, such as, for example, a flywheel, micro-flywheel, micro electromechanical system (MEMS), or a mechanical spring. The energy storage component may also be a thermal energy storage device, such as a thermal mass container, or it could be a chemical energy storage device, such as, for example, a hydrogen generator with hydrogen container or an ozone generator with ozone container. Each one of these devices may be used to store energy based on exemplary elements of the system.

Figure 1A:
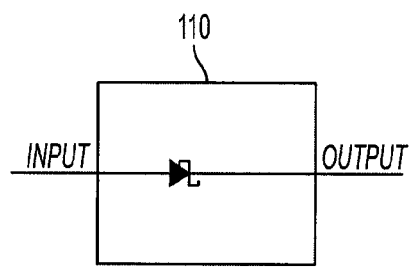
FIG. 1a is a schematic diagram of an exemplary embodiment of a blocking circuit.

FIG. 1a is a schematic diagram of an exemplary embodiment of a blocking circuit. In this embodiment, a Schottky Diode 110 may be used as the blocking circuit to prevent current flow from the device to be charged 106 to the Voltage Monitor Circuit 100. To achieve the same functionality, other mechanisms may also be used as blocking circuits, such as, for example, an active semiconductor device, such as, for example, a MOSFET switch and control circuitry, a relay, or a Micro Electro Mechanical Switch. A Schottky Diode may be a preferable component due to simplicity in design and its very low forward voltage drop, resulting preferably in increased charge efficiency.

Referring back to FIG. 1, if the energy storage device 106 is in an under-voltage condition and requires charging, the energy seen at impedance matching capacitor 104 may cause current to flow into the energy storage device 106. In many cases, particularly with low energy input charge devices, this energy may not energize the Power Dissipation Circuit 102 because, due to the current draw of the energy storage device, the voltage seen at input node 107 may be only slightly above the voltage on the battery or capacitor 106. As the energy storage device 106 becomes fully charged, its voltage, as seen at node 108, may rise and reach a predetermined level. This predetermined level may be related to the safe fully charged level of the energy storage device. The predetermined level of a fully-charged thin film battery, for example, may be 4.10V. When the energy storage device 106 has reached a charged voltage level at or above the predetermined value, subsequent charge pulses developed by the input charge device may raise the voltage at node 107 to a level greater than the predetermined charge level, and the Power Dissipation Circuit 102 can, for example, turn on and dissipate the charge pulse out through node 109.

In some embodiments, low current is generated by the input charge device 105, such as with a solar array that has insufficient light to operate in the voltage mode or an antenna that collects very small amounts of ambient electromagnetic energy from radio waves, etc. In such conditions, current generated by the low current input charge device 105 may still build a voltage, albeit over a longer period of time, on capacitor 104. As the voltage on capacitor 104 builds to a level slightly higher than the voltage on the energy storage device 106 (accounting for the voltage drop across the Blocking Circuit 101), current may flow into the energy storage device 106. In these embodiments, only if voltage builds on the energy storage device 106 to the predetermined level—indicating that it is fully charged—may the Voltage Monitoring Circuit 100 energize. As a result, power may not be lost to the Voltage Monitoring Circuit 100 until the energy storage device 106 is fully charged. This may be true for other charge sources 105 including but not limited to DC source in either voltage or current mode, rectified AC source in either voltage or current mode, piezo electric source, peltier source, fuel cell source, solar source in either voltage or current mode, RF source, inductive source, magnetic source and radio isotope (active) to electric conversion source.

In some embodiments, an energy load (not shown) may be connected to node 108 and powered directly from the energy storage device 106. In other embodiments, an energy load may be connected to node 107 and powered directly from input charge device 105. In yet other embodiments, an energy load may be connected to the output of Power Dissipation Circuit 102. Whether the energy load is connected to one or more of these loads may depend on the anticipated parameters of the energy supplied by the input charge device 105 as well as the sensitivity of the energy load.

In these and other embodiments, one or more of many sorts of sensors may be powered by the energy storage device connected to the protection circuit, thereby serving as the energy load and creating a system for sensing one or more parameters. Some embodiments may also include communication circuitry and one or more antennas that may allow the system to communicate. In such embodiments, when combined with an energy harvesting device (collecting ambient energy), the system may serve as an autonomous powered wireless communication system. These systems may for example include a plurality of transmitting and/or receiving (or having both capabilities) devices. These systems may be used, for example, as a wireless signal listening device, tuned to a plurality of frequencies, and collecting transmitted information and/or performing a function, such as, for example, transmitting a signal, based on certain information that is received. These systems, when having other types of sensors, may function as wireless sensors and communicate data that is measured by the sensor. The system may also be used, for example, as a wireless receiver component to an autonomous electrical circuit which, upon receiving a wireless command signal, performs a function.

In several embodiments, some or all of the elements of the passive power management unit, the input charge device, and the energy storage device are all formed on a single substrate such as, for example, a flexible circuit board or semiconductor chip.

In the several embodiments in which the energy storage device is a rechargeable device, such as, for example, a thin-film battery or capacitor, this will present an opportunity whereby the present invention may be capable of performing nearly indefinitely. The present invention may, for example, allow for energy created through radio frequency, wind power, solar power, vibration, human activity, water movement, temperature variations and rotational movements to be harvested in an energy harvesting mechanism and for that harvested energy to ensure that the rechargeable energy storage device may be so charged.

Figure 2:
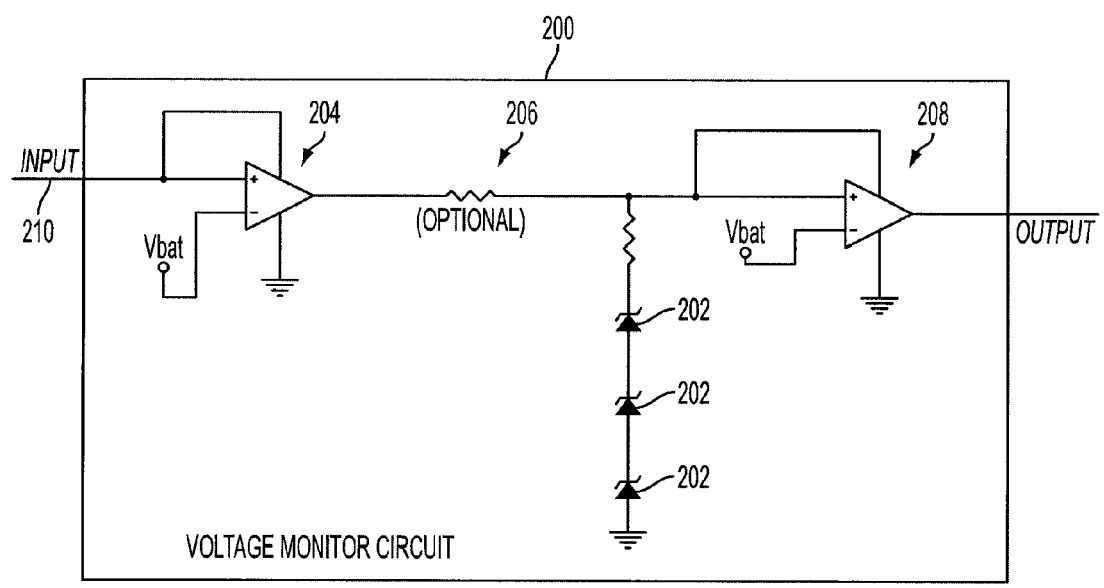
FIG. 2 is a schematic diagram of an exemplary embodiment of a voltage monitor circuit.

FIG. 2 is a schematic diagram of an exemplary embodiment of a voltage monitoring circuit. The monitoring circuit 200 can be, for example, a series of precision low current shunt voltage references 202 with a high impedance amplifier 204 to provide isolation, powered solely by the input charge energy source, isolating the reference current until sufficient energy is available from the input charge device. Device 204 may be a high impedance, low quiescent current operational amplifier that is powered via the same line as its non-inverting input. This exemplary device may not use power unless the power is available via the input line 210 or when charging power is available. The usage of operational amplifiers this way in this exemplary embodiment may help to achieve desired low power operations because if there is no charge energy from the input charge device, there may be no quiescent current usage by the voltage monitor circuit. Device 208, which operates when device 204 is operating, can be another operational amplifier that functions as a comparator. Device 208 can be powered by the same line as its non-inverting input. Diodes 202 can be, for example, "off the shelf" 1.25V shunt references. Optionally, voltage divider resistors 206 and 207 can be used to ensure voltage at the non-inverting input of device 208 is preferably within a predetermined limit for maximum voltage.

Figure 3:
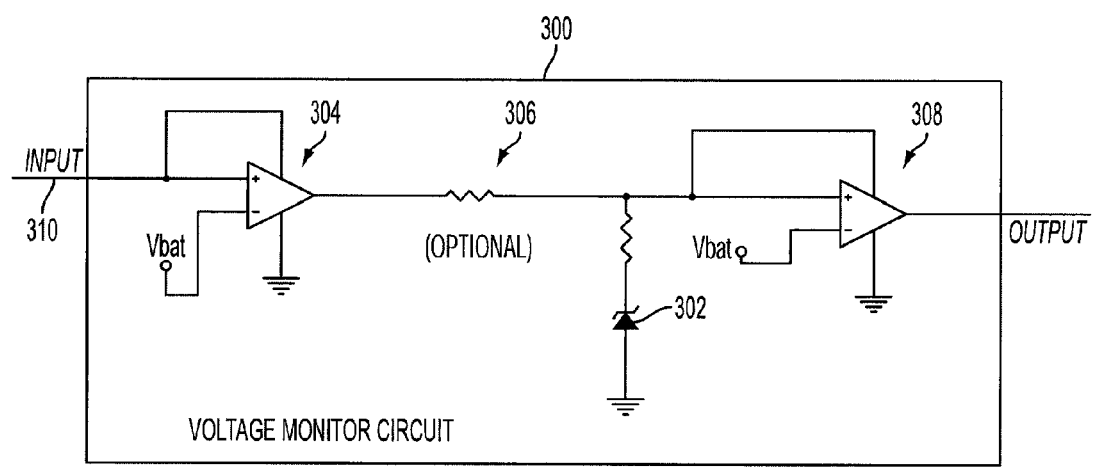
FIG. 3 is a schematic diagram of an exemplary embodiment of another voltage monitor circuit.

FIG. 3 is a schematic diagram of an exemplary embodiment of another voltage monitor circuit. This figure illustrates that, to achieve the same functionality as shown in FIG. 2, a voltage monitor circuit 300 may include, for example, only one precision low current shunt voltage reference 302, voltage divider resistors 306 and 307, a high impedance amplifier 304 to provide isolation, powered solely by the input charge energy source, isolating the reference current until the energy storage device (not shown) is charged and/or sufficient energy is available from the input charge device (not shown).

Figure 4:
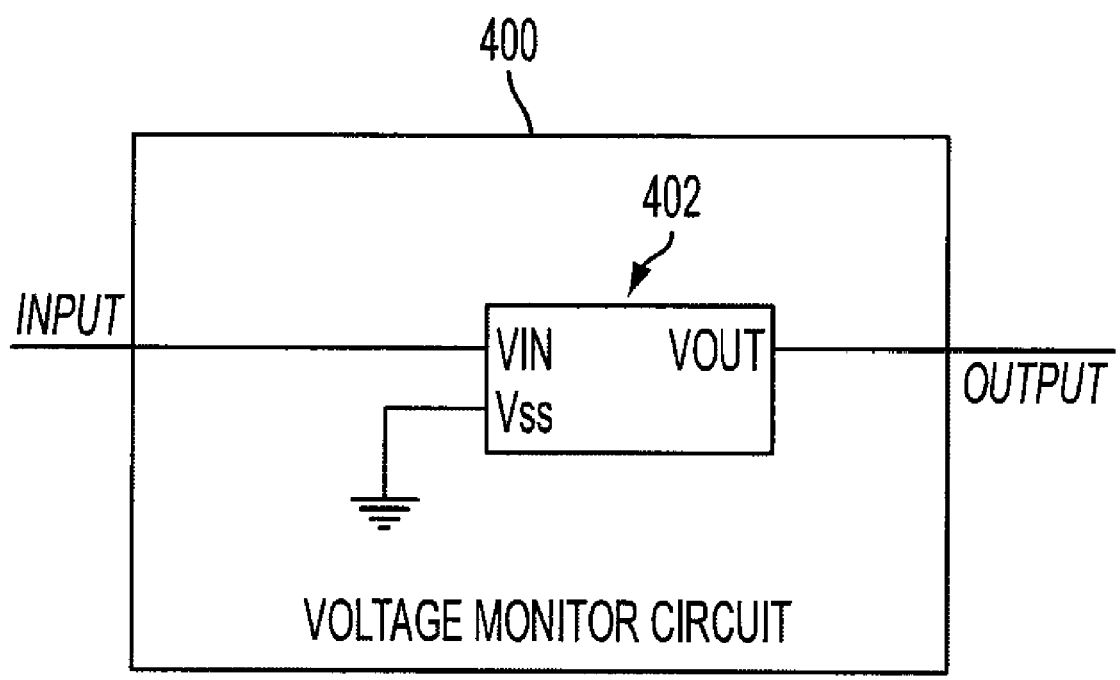
FIG. 4 is a schematic diagram of an exemplary embodiment of another voltage monitor circuit.

FIG. 4 is a schematic diagram of an exemplary embodiment of another voltage monitor circuit. It illustrates a particular single chip solution for voltage monitor. The chip can be a semiconductor 402, powered solely by the input charge energy source, isolating the reference current until sufficient energy is available from the input charge device. One example of such semiconductor chip may be a Seiko S-1000 voltage detector, which has extremely low quiescent current, and a fixed detection voltage value.

Figure 5:
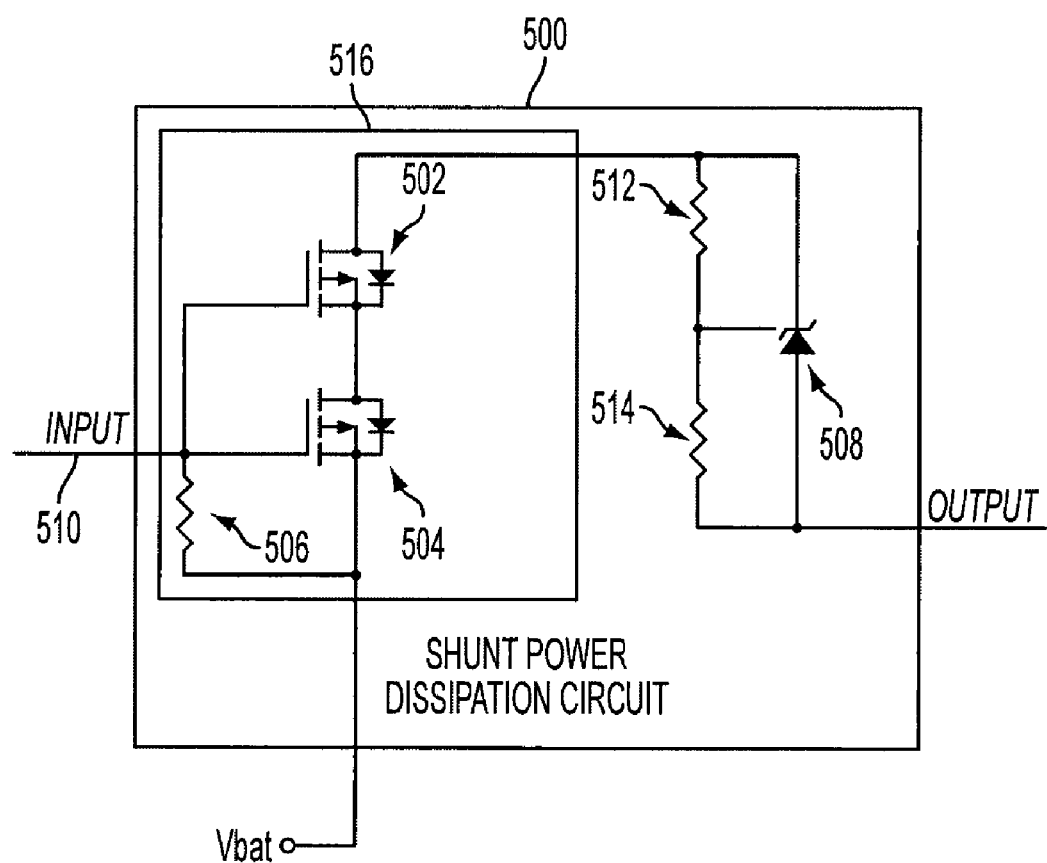
FIG. 5 is a schematic diagram of an exemplary embodiment of a shunt regulator power dissipation option.

FIG. 5 is a schematic diagram of an exemplary embodiment of a shunt power dissipation circuit 500. In this embodiment, circuit 500 may contain a power dissipation circuit switch 516 made from a pair of field effect transistors (FETs) 502 and 504 with a forward bias resistor 506. Although the use of dual FET switches 502 and 504, which are shown as serially coupled, may make the leakage current extremely small, one FET may be used instead to further reduce losses. Circuit 500 also contains a shunt voltage reference circuit 508. The shunt voltage reference circuit 508 may contain an adjustable zener diode shunt load 511 through two resistors 512 and 514. Circuit 500 can be powered solely by an input charge energy source (not shown) as seen through a voltage monitor circuit (not shown) and connected to input node 510, thereby isolating the power dissipation circuit 500 until sufficient energy is available from the input charge device and an over voltage condition exists. When there is excess energy supplied by the charge energy source, a voltage monitor may operate the power dissipation circuit switch 516 to drain the excess energy from the energy storage device (connected to Vbat) to shunt voltage reference circuit.

Figure 6:
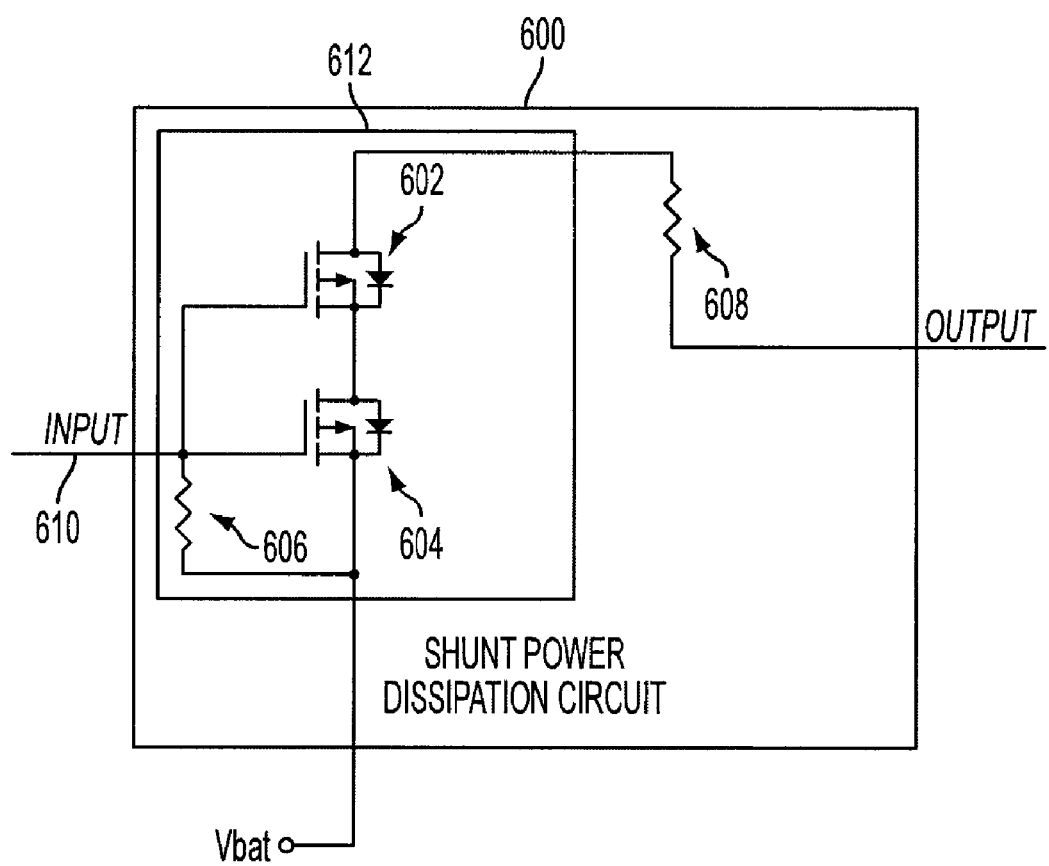
FIG. 6 is a schematic diagram of an exemplary embodiment of another shunt regulator power dissipation option.

FIG. 6 is a schematic diagram of an exemplary embodiment of another shunt regulator power dissipation circuit 600. In circuit 600, a power dissipation circuit switch device 612 may contain dual FET switches 602 and 604 and forward bias resistor 506, similar to the one shown in FIG. 5. Unlike FIG. 5, however, circuit 600 may contain only a simple resistive load 608. Circuit 600 may be powered solely by the input charge energy source (not shown) as seen through a voltage monitor circuit (not shown) and connected to input node 610, thereby isolating the power dissipation circuit 600 until sufficient energy is available from the input charge device and an over voltage condition exists. In certain embodiments, the voltage monitor circuit, which can be connected to the input 610 can maintain its reference voltage and switch the power dissipation circuit 600 "on" and "off" as required. The reference voltage can be maintained through the determination of whether a charge pulse is developed and causes the voltage to rise past the predetermined charge level.

FIGS. 5 and 6 illustrate certain exemplary options for power dissipation circuit switch devices and power dissipation circuits containing discrete devices. Other examples of power dissipation circuit switching device may include circuits using one or a more of a bipolar transistor, field effect transistor, relay, Micro Electro Mechanical Switch (MEMS) relay, or semiconductor circuit.

Examples of other shunt power dissipation circuits may include, for example, the use of a semiconductor circuit. All these examples may, for example, be powered solely by the input charge energy source, isolating the power dissipation circuit until excess energy is entering from the input charge device and an over voltage condition exists for the energy storage device.

Circuits shown as separate entities above may also be combined into a single chip solution by using a combined semiconductor circuit. For example, a voltage monitor circuit and a power dissipation circuit can be combined into a semiconductor circuit. As another example, a voltage monitor circuit, a blocking circuit, and a power dissipation circuit may also be combined into a semiconductor circuit. Such a configuration, may, for example, have as few as three external connections: an input connect to the input charge device, and output to connect to the energy storage device, and a drain to connect to ground or a device that can use or collect the excess energy. A single combined semiconductor circuit may also include circuits that are not shown in any previously illustrated exemplary embodiments. For instance, in addition to a voltage monitor circuit, a blocking circuit, or a power dissipation circuit, a semiconductor circuit may also include a combination of a rectification circuit for conversion of AC charge input to DC, a voltage boost converter, and a voltage boost converter that has no upper voltage regulation requirement. All such combined semiconductor circuits may be powered solely by the input charge energy source, isolating the power dissipation circuit until sufficient energy is available from the input charge device and an over voltage condition exists.

The present invention applies not only to one input charge device and one battery or capacitor to be charged, as shown in FIG. 1 (105 and 106), but also may be applied to multiple input charge devices in series or parallel and multiple batteries or capacitors to be charged in series or parallel.

Figure 7:
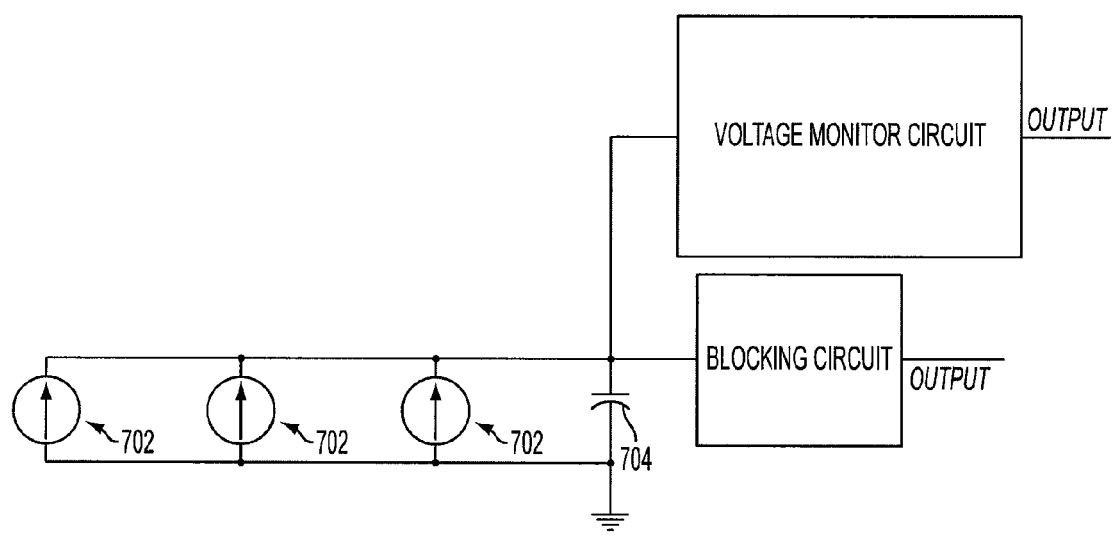
FIG. 7 is a block diagram of an exemplary embodiment of using multiple charge sources in parallel.

FIG. 7 shows a block diagram of an exemplary embodiment for using multiple input charge devices in parallel. In FIG. 7, multiple input charge devices 702 are coupled in parallel to serve as a single input source for both a blocking circuit and a voltage monitor circuit. All input charge devices may further be connected to the same impedance matching capacitor 704. Note that the multiple input charge devices 702 are not necessarily the same type of device, as, in certain applications, it may be beneficial to obtain energy through a variety of methods.

Figure 8:
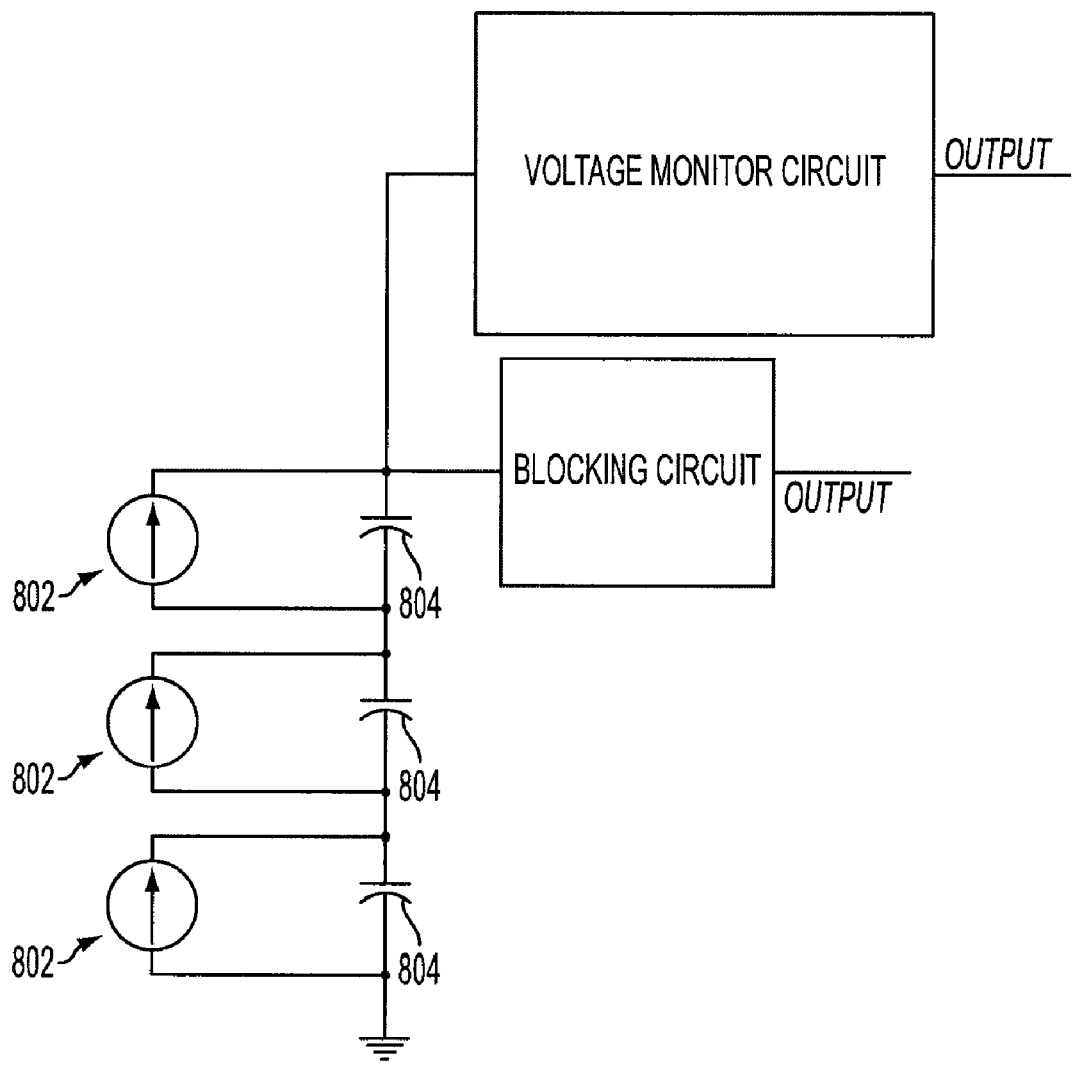
FIG. 8 is a block diagram of an exemplary embodiment of using multiple charge sources in series.

FIG. 8 shows a block diagram of an exemplary embodiment depicting the use of multiple input charge devices in series. In FIG. 8, multiple input charge devices 802 can be serially connected to serve as a single input source for both blocking circuit and voltage monitor circuit. Each input charge device can be coupled to, for example, a corresponding impedance matching capacitor 804. As previously mentioned, multiple input charge devices 802 are not necessarily the same type of device, as, in certain applications, it may be beneficial to obtain energy through a variety of methods.

Figure 9:
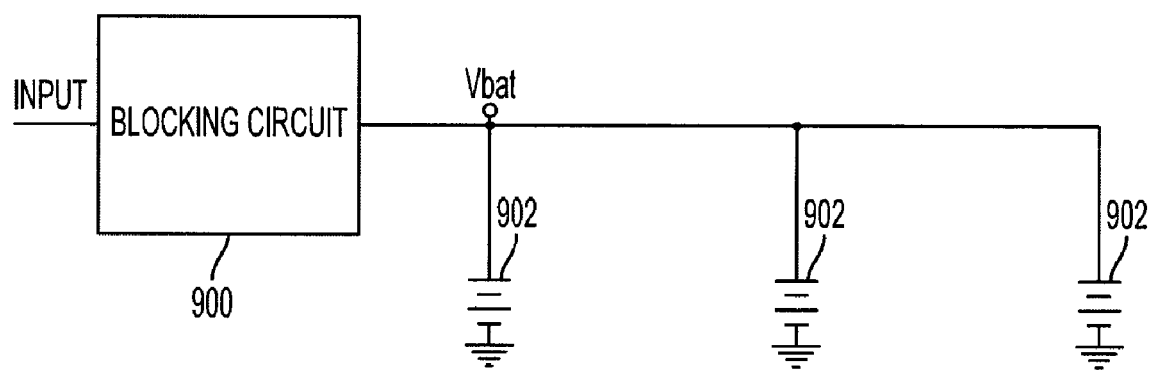
FIG. 9 is a block diagram of an exemplary embodiment of charging multiple batteries, battery cells, or capacitors in parallel.

FIG. 9 shows a block diagram of an exemplary embodiment for charging multiple batteries, battery cells, or capacitors in parallel. In FIG. 9, multiple batteries or capacitors to be charged 902 can be coupled in parallel to the output of a single blocking circuit 904.

Figure 10:
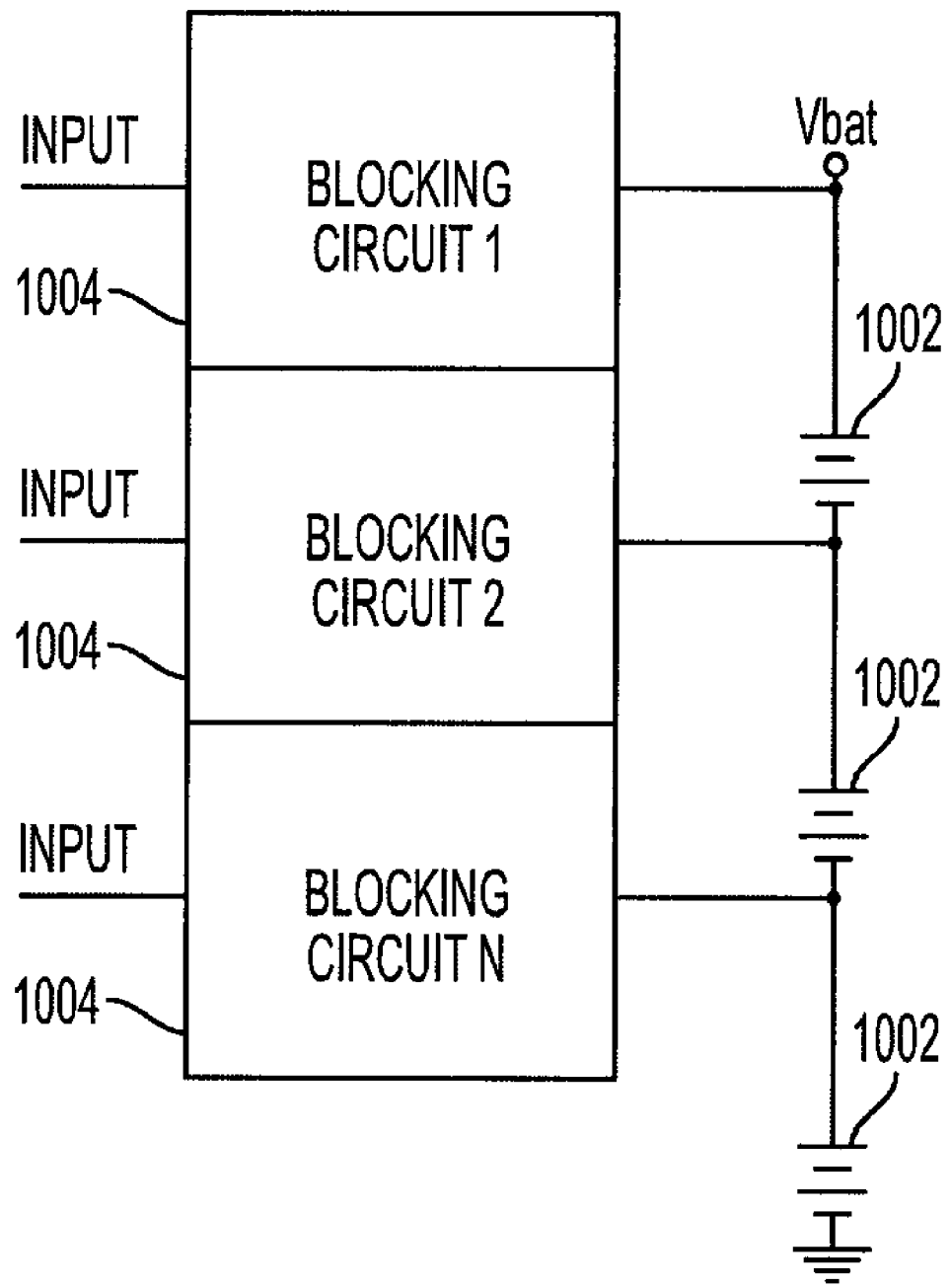
FIG. 10 is a block diagram of an exemplary embodiment of charging multiple batteries, battery cells, or capacitors in series.

FIG. 10 shows a block diagram of an exemplary embodiment of charging multiple batteries, battery cells, or capacitors in series. In FIG. 10, multiple batteries or capacitors to be charged 1002 can be serially connected to the outputs of multiple blocking circuits 1004. Each individual battery or capacitor to be charged may be, for example, coupled to its corresponding blocking circuit. Voltage can be controlled for each battery or capacitor to be charged individually through the corresponding blocking circuit, which also has a corresponding power dissipation circuit.

When charging multiple batteries or capacitors in series, it is also, for example, possible to only monitor voltage at the top of the stack and regulate from the top of the stack. In this case, there may preferably need to be only one blocking circuit and one power dissipation circuit for all the batteries or capacitors connected serially.

Figure 11:
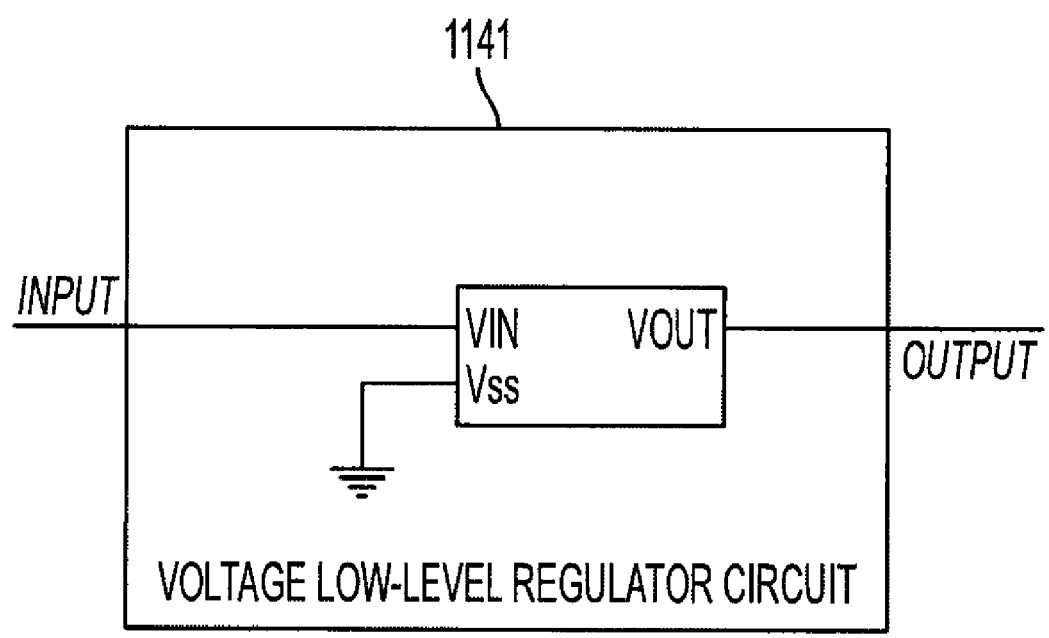
FIG. 11 is a circuit diagram of an exemplary embodiment of an under-voltage protection circuit.

FIG. 11 shows a circuit diagram of an optional under-voltage protection circuit 1100. If connected, the input terminal is connected to node 108 while the output terminal would be connected to an electronic user circuit (not shown). The under-voltage protection circuit operates by monitoring the voltage at node 108 and, when it falls below the minimum predetermined under-voltage level, the electronic user circuit is disconnected from the energy storage device by a switching circuit (not shown). Once the voltage of the energy storage device reaches a value above the predetermined under-voltage level, circuit 1100 operates to reconnect the energy storage device to the electronic user circuit. A predetermined low-voltage level is generally specific to the type of energy storage device used. For example, a thin film battery may have a save operating range above 2.0V and the predetermined voltage level may therefore be set to 2.5V.

The embodiments and examples described above are exemplary only. One skilled in the art may recognize variations from the embodiments specifically described here, which are intended to be within the scope of this disclosure and invention. As such, the invention is limited only by the following claims. Thus, it is intended that the present invention cover the modifications of this invention provided they come within the scope of the appended claims and their equivalents.

What is claimed is:

1. An apparatus comprising:
    at least one input charge device having a charge potential energy;
    at least one blocking circuit comprising an input terminal and an output terminal, said blocking circuit input terminal connected to said at least one input charge device;
    at least one energy storage device connected to said output terminal of said at least one blocking circuit, said at least one energy storage device having a voltage and a predetermined safe voltage level;
    at least one voltage monitor circuit comprising an input terminal, a reference terminal, and an output terminal, said first voltage monitor circuit input terminal being connected to said blocking circuit input terminal; and
    at least one power dissipation circuit adapted to be electrically connected to said at least one energy storage device when charge energy from said at least one input charge device exceeds the voltage in said at least one energy storage device and the voltage of said energy storage device exceeds a predetermined over-charge value.

2. The apparatus of claim 1, further comprising a plurality of input charge devices electrically connected in parallel to said blocking circuit input terminal.

3. The apparatus of claim 1, further comprising a plurality of input charge devices electrically connected in series to said blocking circuit input terminal.

4. The apparatus of claim 1, further comprising a plurality of energy storage devices electrically connected in parallel to said output terminal of said at least one blocking circuit.

5. The apparatus of claim 1, further comprising a plurality of energy storage devices electrically connected in series to said output terminal of said at least one blocking circuit.

6. The apparatus of claim 1, further comprising at least one rectification circuit interposed between said at least one input charge device and said blocking circuit input terminal.

7. The apparatus of claim 1, further comprising at least one RC filter circuit interposed between said at least one input charge device and said blocking circuit input terminal.

8. The apparatus of claim 1, further comprising at least one capacitive DC current block interposed between said at least one input charge device and said blocking circuit input terminal.

9. The apparatus of claim 1, further comprising at least one capacitive DC current block interposed between said at least one input charge device plus an associated rectification device and said blocking circuit input terminal.

10. The apparatus of claim 6, further comprising a voltage boost converter connected to said at least one input charge device.

11. The apparatus of claim 1 wherein said at least one input charge device comprises any device selected from the group of: DC current source, AC current source, rectified AC current source, DC voltage source, AC voltage source, rectified AC voltage source, piezoelectric source, thermoelectric source, fuel cell source, radio-frequency transducer, solar cell, wind turbine, radio isotope to electric source, inductive source, magnetic source, vibration energy scavenger, water movement-to-electric energy converter, rotational movement-to-electric energy converter, temperature variation-to-electric energy converter, magnetostrictive device.

12. The apparatus of claim 1 wherein said at least one blocking circuit comprises any device selected from the group of: diode, Schottky diode, mechanical relay, solid state relay, active semiconductor device, Micro Electro Mechanical Switch, field effect transistor, field effect transistor pair, field effect transistor array.

13. The apparatus of claim 1 wherein said at least one voltage monitor circuit is adapted to be electrically connected to said at least one input charge device and said at least one energy storage device only when said charge voltage of said at least one input charge device exceeds said predetermined safe voltage level of said at least one energy storage device.

14. The apparatus of claim 1 wherein said at least one voltage monitor circuit is adapted to isolate said at least one power dissipation circuit from said at least one energy storage device until said at least one energy storage device voltage exceeds said predetermined safe voltage level.

15. The apparatus of claim 1 wherein said at least one voltage monitor circuit comprises any device selected from the group of: a single precision low current shunt voltage reference with a high impedance amplifier; a plurality of precision low current shunt voltage references with at least one high impedance amplifier; a semiconductor monitoring device.

16. The apparatus of claim 1 wherein said at least one power dissipation circuit comprises
a power dissipation circuit switching device; and
a shunt power dissipation circuit electrically connected to said power dissipation circuit switching device.

17. The apparatus of claim 16 wherein said power dissipation circuit switching device comprises any device selected from the group of: field effect transistor, bipolar transistor, relay, MEMS relay, semiconductor circuit.

18. The apparatus of claim 16 wherein said shunt power dissipation circuit comprises any circuit selected from the group of: shunt voltage reference circuit, resistive load circuit, semiconductor circuit, battery, consumer electronic device.

19. The apparatus of claim 1 wherein said at least one power dissipation circuit and said at least one voltage monitor circuit are positioned on a single semiconductor chip and powered solely by said at least one input charge device.

20. The apparatus of claim 1 wherein said at least one power dissipation circuit, said at least one blocking circuit, and said at least one voltage monitor circuit are positioned on a single semiconductor chip and powered solely by said at least one input charge device.

21. The apparatus of claim 1 wherein said at least one input charge device, said at least one blocking circuit, said at least one energy storage device, and said at least one power dissipation circuit are positioned on a flexible substrate.

22. The apparatus of claim 1 wherein said at least one input charge device, said at least one blocking circuit, said at least one energy storage device, and said at least one power dissipation circuit are positioned within a flexible substrate.

23. The apparatus of claim 21 wherein said flexible substrate comprises a material selected from the group of: polyimide-based flexible circuit, polyester-based flexible circuit, polyethylene naphthalate-based flexible circuit, polyetherimide-based flexible circuit, aramid-based flexible circuit, and epoxy-based flexible circuit.

24. The apparatus of claim 1 wherein said at least one input charge device, said at least one blocking circuit, said at least one energy storage device, and said at least one power dissipation circuit are positioned on a printed circuit board.

25. The apparatus of claim 1, wherein said at least one input charge device comprises any device selected from the group of: piezoelectric transducer, radio-frequency transducer, solar cell, wind turbine, vibration energy scavenger, water movement-to-electric energy converter, rotational movement-to-electric energy converter, and temperature variation-to-electric energy converter, magnetostrictive energy converter.

26. The apparatus of claim 1 wherein said at least one energy storage device comprises any device selected from the group of: battery, thin-film battery, capacitor, thin-film capacitor, chemical double layer capacitor, magneto-electric element, piezoelectric element, thermal mass container, flywheel, micro-flywheel, micro electro mechanical system (MEMS), mechanical spring, hydrogen generator further comprising a hydrogen container, and ozone generator further comprising an ozone container.

27. An apparatus comprising:
a first node;
at least one voltage monitor circuit comprising an input terminal, a reference terminal and an output terminal, said at least one voltage monitor circuit input terminal connected to said first node;
at least one blocking circuit comprising an input terminal and an output terminal, said blocking circuit input terminal electrically connected to said first node;
a second node electrically connected to said blocking circuit output terminal;
at least one power dissipation circuit having an input terminal, a signal terminal and an output terminal, said input terminal of said at least one power dissipation circuit electrically connected to said second node and said signal terminal of said at least one power dissipation circuit electrically connected to said output terminal of said at least one voltage monitor circuit; and
a third node electrically connected to said output terminal of said at least one power dissipation circuit.

28. The apparatus of claim 27 further comprising at least one energy storage device electrically connected to said second node, said at least one energy storage device having a voltage.

29. The apparatus of claim 28 further comprising said at least one power dissipation circuit adapted to allow electrical current to flow from said input terminal of said power dissipation circuit to said output terminal of said power dissipation circuit when said voltage of at least one energy storage device is greater than a predetermined over-charge value.

30. The apparatus of claim 28 wherein said input terminal of said power dissipation circuit is electrically isolated from said output terminal of said power dissipation circuit when the voltage measured by said at least one voltage monitor circuit is less than a predetermined over-charge value.

31. The apparatus of claim 27 further comprising at least one input charge device connected to said first node.

32. The apparatus of claim 31 wherein said at least one input charge device comprises an energy harvesting device.

33. The apparatus of claim 32 wherein said at least one energy-harvesting mechanism comprises any device selected from the group of: piezoelectric transducer, radio-frequency transducer, solar cell, wind turbine, vibration energy scavenger, water movement-to-electric energy converter, rotational movement-to-electric energy converter, magnetostrictive energy converter, and temperature variation-to-electric energy converter.

34. The apparatus of claim 28 further comprising an energy load, said energy load electrically connected to said first node.

35. The apparatus of claim 28 further comprising an energy load, said energy load electrically connected to said second node.

36. The apparatus of claim 28 further comprising an energy load, said energy load electrically connected to said third node.

37. The apparatus of claim 35 further comprising an under-voltage protection circuit interposed between said energy load and said second node, said under-voltage protection circuit adapted to electrically isolate said energy load from said second node when said voltage of at least one energy storage device is less than a predetermined under-voltage value.

38. The apparatus of claim 31 further comprising at least one energy storage device electrically connected to said second node; wherein said at least one input charge device, said at least one voltage monitor circuit, said at least one blocking circuit, said at least one energy storage device, and said at least one power dissipation circuit located on a flexible substrate.

39. The apparatus of claim 31 further comprising at least one energy storage device electrically connected to said second node; wherein said at least one input charge device, said at least one voltage monitor circuit, said at least one blocking circuit, said at least one energy storage device, and said at least one power dissipation circuit located within a flexible substrate.

40. The apparatus of claim 38, wherein said flexible substrate comprises a material selected from the group of: polyimide-based flexible circuit, polyester-based flexible circuit, polyethylene naphthalate-based flexible circuit, polyetherimide-based flexible circuit, aramid-based flexible circuit, and epoxy-based flexible circuit.

41. The apparatus of claim 31 further comprising said at least one input charge device, said at least one voltage monitor circuit, said at least one blocking circuit, said at least one energy storage device, and said at least one power dissipation circuit positioned on a printed circuit board.

42. The apparatus of claim 31 further comprising said at least one input charge device, said at least one voltage monitor circuit, said at least one blocking circuit, said at least one energy storage device, and said at least one power dissipation circuit positioned within a printed circuit board.

43. The apparatus of claim 28 wherein said at least one energy storage device comprises any device selected from the group of: battery, thin-film battery, capacitor, thin-film capacitor, chemical double layer capacitor, magneto-electric element, piezoelectric element, thermal mass container, flywheel, micro-flywheel, micro electro-mechanical system (MEMS), mechanical spring, hydrogen generator further comprising a hydrogen container, and ozone generator further comprising an ozone container.

44. An ambient energy powered system comprising:
at least one input charge device electrically connected to a first node, said input charge device comprising an energy harvesting device;
a passive power management unit comprising a first terminal, a second terminal, a third terminal, said first terminal electrically connected to said first node, said passive power management unit comprising:
at least one voltage monitor circuit, said at least one voltage monitor circuit comprising a first terminal, a reference terminal and a second terminal, said first terminal of said voltage monitor circuit electrically connected to said first terminal of said passive power management unit;
at least one blocking circuit, said at least one blocking circuit comprising a first terminal and a second terminal, said first terminal of said at least one blocking circuit electrically connected to said first terminal of said passive power management unit and said second terminal of said at least one blocking circuit electrically connected to said second terminal of said passive power management unit;
at least one power dissipation circuit comprising an input terminal, an output terminal, and a signal terminal, said power dissipation circuit input terminal electrically connected to said second terminal of said passive power management unit and said power dissipation circuit output terminal electrically connected to said third terminal of said passive power management unit; and
at least one energy storage device electrically connected to said second terminal of said passive power management unit;
wherein said at least one power dissipation circuit is adapted to electrically connect said second terminal of said passive power management unit to said third terminal of said passive power management unit when the voltage level of said at least one energy storage device exceeds a predetermined over-charge value.

45. The ambient energy powered system of claim 44 further comprising said power dissipation circuit powered solely by said at least one input charge device.

46. The ambient energy powered system of claim 44 wherein said at least one energy storage device comprises any device selected from the group of: battery, capacitor.

47. The ambient energy powered system of claim 44 further comprising said at least one input charge device electrically disconnected from said at least one energy storage device when the voltage level of said at least one energy storage device is greater than a preset over-charge value.

48. The ambient energy powered system of claim 44 wherein said at least one power dissipation circuit is adapted to isolate said at least one energy storage device electrically from said third terminal of said at least one power dissipation circuit when said voltage of at least one energy storage device is less than a predetermined over-charge value.

49. The ambient energy powered system of claim 44 further comprising said output terminal of said power dissipation circuit connected to any device selected from the group of: shunt voltage reference circuit, resistive load circuit, semiconductor circuit, additional energy storage device, consumer electronic device.

50. An autonomously-powered energy system comprising:
at least one input charge device electrically connected to a first node, said input charge device comprising an energy harvesting device;
a passive power management unit comprising a first terminal, a second terminal, and a third terminal, said first terminal electrically connected to said first node, said passive power management unit comprising:
at least one voltage monitor circuit, said at least one voltage monitor circuit comprising a first terminal, a reference terminal and a second terminal, said first terminal of said voltage monitor circuit electrically connected to said first terminal of said passive power management unit;
at least one blocking circuit, said at least one blocking circuit comprising a first terminal and a second terminal, said first terminal of said at least one blocking circuit electrically connected to said first terminal of said passive power management unit and said second terminal of said at least one blocking circuit electrically connected to said second terminal of said passive power management unit;
at least one power dissipation circuit comprising an input terminal, an output terminal, and a signal terminal, said power dissipation circuit input terminal electrically connected to said second terminal of said passive power management unit and said power dissipation circuit output terminal electrically connected to said third terminal of said passive power management unit;
at least one energy storage device electrically connected to said second terminal of said passive power management unit, said energy storage device comprising a thin film battery;
at least one wireless system connected to said energy storage device, said wireless system comprising at least one wireless sensor; and wherein said at least one power dissipation circuit is adapted to electrically connect said second terminal of said passive power management unit to said third terminal of said passive power management unit when the voltage level of said at least one energy storage device exceeds a predetermined over-charge value.

51. The autonomously-powered energy system of claim 50 wherein said at least one power dissipation circuit is adapted to electrically isolate said at least one energy storage device from said output terminal of said at least one power dissipation circuit when the voltage level of said at least one energy storage device is less than a predetermined over-voltage value.

52. An apparatus comprising:
   at least one input charge device having a charge voltage;
   at least one blocking circuit comprising an input terminal and an output terminal, said blocking circuit input terminal connected to said at least one input charge device;
   at least one energy storage device connected to said output terminal of said at least one blocking circuit, said at least one energy storage device having a voltage and a predetermined safe voltage level;
   at least one voltage monitor circuit comprising an input terminal, a reference terminal, and an output terminal, said first voltage monitor circuit input terminal being connected to said blocking circuit input terminal; and
   at least one power dissipation circuit connected in parallel to said at least one energy storage device in response to a signal from the output terminal of the at least one voltage monitor circuit.

* * * * *